(12) United States Patent
Hayashida et al.

(10) Patent No.: US 7,869,082 B2
(45) Date of Patent: Jan. 11, 2011

(54) MULTI-FUNCTION INPUT/OUTPUT DEVICE AND METHOD

(75) Inventors: Yukihide Hayashida, Tokyo (JP);
Kenichi Iwama, Kanagawa (JP);
Kazuhiro Yamada, Kanagawa (JP);
Kiyoshi Kasatani, Kanagawa (JP);
Naoki Takashima, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 1031 days.

(21) Appl. No.: 11/653,380

(22) Filed: Jan. 16, 2007

(65) Prior Publication Data
US 2007/0182982 A1 Aug. 9, 2007

(30) Foreign Application Priority Data

Jan. 18, 2006 (JP) ............................ 2006-009631
Jun. 1, 2006 (JP) ............................ 2006-153295

(51) Int. Cl.
*G06F 15/00* (2006.01)
*G06F 15/173* (2006.01)

(52) U.S. Cl. ..................................... 358/1.18; 709/224

(58) Field of Classification Search ................ 358/1.18, 358/1.15, 1.13, 1.14, 1.16, 1.1, 401; 713/182, 713/189, 153; 235/437, 462.01; 717/178; 399/84; 709/224, 246, 232, 250, 219, 202; 455/566; 370/352, 356
See application file for complete search history.

(56) References Cited

U.S. PATENT DOCUMENTS 5,051,779 A 9/1991 Hikawa et al.

6,563,598 B1 * 5/2003 Johnson et al. ............ 358/1.15
2002/0144257 A1 10/2002 Matsushima
2005/0204145 A1 9/2005 Makishima

FOREIGN PATENT DOCUMENTS

| JP | 09-261382 | 10/1997 |
| JP | 11-187247 | 7/1999 |
| JP | 2000-019892 | 1/2000 |
| JP | 2003-198770 | 7/2003 |
| JP | 2004-326681 | 11/2004 |
| JP | 2005-123699 | 5/2005 |

OTHER PUBLICATIONS

European Search Report.

* cited by examiner

*Primary Examiner*—Saeid Ebrahimi Dehkordy
(74) *Attorney, Agent, or Firm*—Harness, Dickey & Pierce, P.L.C.

(57) ABSTRACT

In a multi-function input/output device, an optical reading unit optically reads an optically readable code from a device control setting medium on which device control setting information, including use authentication information and unit-control-setting information for a document input control setting unit, a document-data-processing control setting unit, and a document-data-output control setting unit, is recorded. The device control setting information including the use authentication information is recognized from the code read by the optical reading unit. A user authentication unit authenticates the user by using a use authentication code of the use authentication information. A setting processing unit sets the unit-control-setting information based on a recognition result of the device control setting information and the use authentication information.

17 Claims, 26 Drawing Sheets

FIG.7

UNIT CONTROL SETTING INFO. AREA

- DOCUMENT INPUT FROM NETWORK:
  DOCUMENT ACQUISITION NODE ADDRESS= http://www.O×.co.jp/O×.jpg
- EXECUTION OF DOCUMENT INPUT FROM NETWORK
- PROCESSING OF DOCUMENT DATA: COLOR REDUCTION PROCESS= MONOCHROME
- EXECUTION OF PROCESSING OF DOCUMENT DATA
- STORING DATA IN EXTERNAL STORAGE: STORAGE LOCATION PATH= H:¥FLASH¥
- EXECUTION OF STORING DATA IN EXTERNAL STORAGE
- MAIL TRANSMISSION: MAIL ADDRESS= XXXXX@MMMM.co.jp
- EXECUTION OF MAIL TRANSMISSION

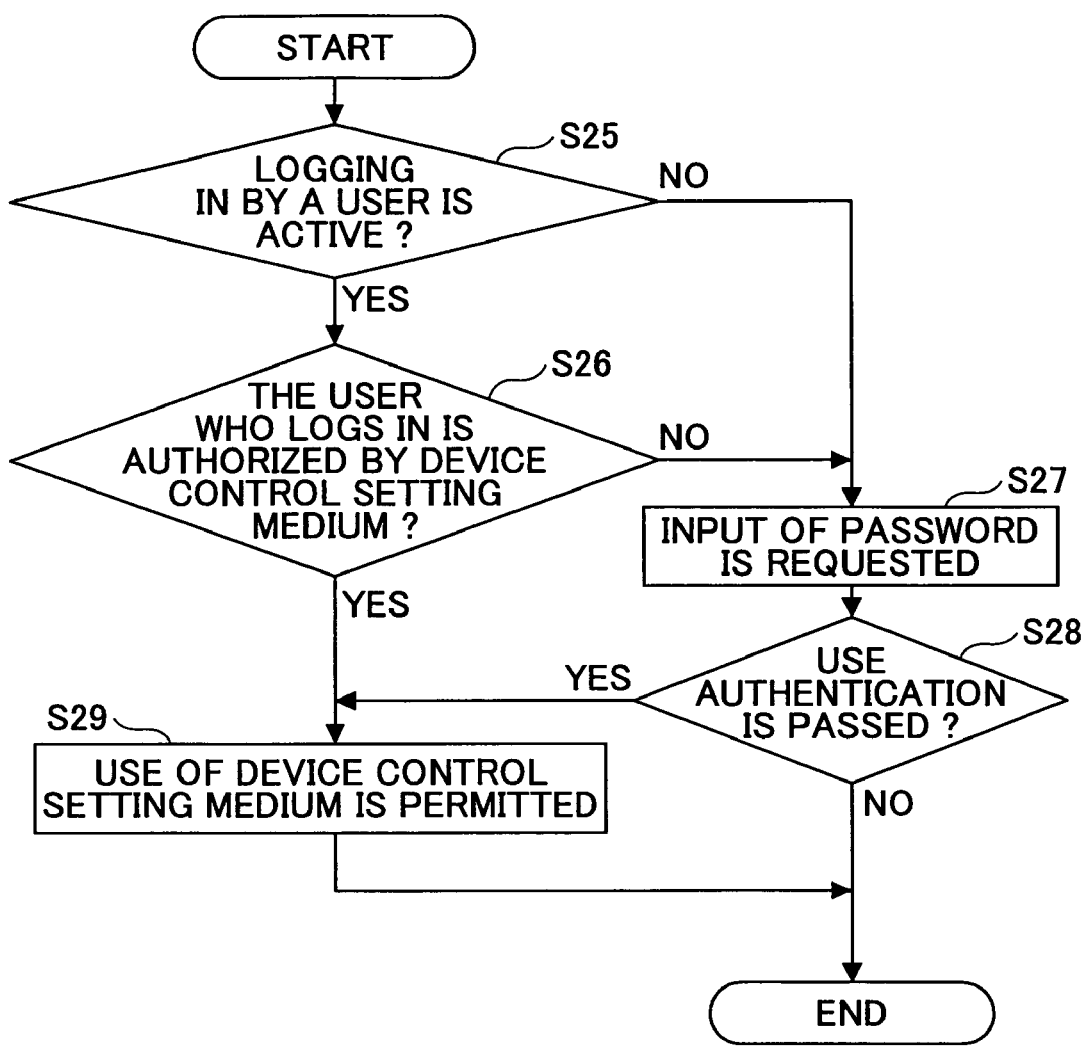

MULTI-FUNCTION INPUT/OUTPUT DEVICE AND METHOD

BACKGROUND OF THE INVENTION

1. Field of the Invention

The present invention relates to a multi-function input/output device and method in which input/output processing of data of a document containing a two-dimensional code is performed.

2. Description of the Related Art

In recent years, various types of multi-function peripherals (MFP), including digital copiers, which have multiple image forming functions, such as copying, printing, scanning and facsimile, have been spread. In a case of a digital copier, the number of device control setting items, such as image forming conditions, which must be set up by the user in order to use efficiently the multiple functions of the digital copier, is increasing.

However, the size of a liquid crystal display or the number of hard keys in an operation input unit, which is provided as an input unit for inputting the setup into the digital copier, is limited. For this reason, the number of displaying layers for allowing switching of the display screens of the setting menu in the liquid crystal display tends to be increased, and this causes the ease of use of the device for the user to get worse.

To obviate the problem, Japanese Laid-Open Patent Application No. 09-261382 discloses a digital multi-function peripheral (MFP) in which image forming conditions are printed as a bar code in an optically readable state and the bar code is read and recognized using a scanner of the MFP, so that the MFP is automatically set up in the image forming conditions.

Moreover, in recent years, a digital multi-function peripheral (MFP) which is provided as a terminal at a node of a network is proposed. With the use of this digital MFP, it is possible that document data of handwritten documents or paper materials be electronized, and that the data be shared and utilized through the network. Moreover, with the use of this digital MFP, it is possible to distribute an input image on the digital MFP to a predetermined personal computer from the digital MFP through the network.

In addition to the use of a recent digital MFP as a terminal at a node of a network, the security for the digital MFP is another important factor. And there is a demand for adding to the digital MFP a security function of restricting the use of the digital copier to authorized users. Namely, the security function being added is to inhibit the use of the digital MFP for unauthorized users and permit the use of the digital MFP for authorized users.

However, the digital MFP as disclosed in Japanese Laid-Open Patent Application No. 09-261382 has the problem that the user has to perform a number of device control setting operations including not only inputting the image forming conditions manually but also inputting the network setting conditions manually, such as destination node paths or receiving-node file storing location paths, and this causes the ease of use of the digital MFP for the users who use many functions to get worse.

SUMMARY OF THE INVENTION

According to one aspect of the invention, there is provided an improved multi-function input/output device and method in which the above-described problems are eliminated.

According to one aspect of the invention there is provided a multi-function input/output device in which the ease of use of the device for the user is improved without the need of inputting the network setting conditions manually, and the use of the device is permitted only for authorized users to attain a raised security for the device, when the device is provide so that the image forming conditions and the network setting conditions are printed on a device control setting medium in an optically readable state and the medium is read and recognized using a scanner, so as to set up the device in the setting conditions.

In an embodiment of the invention which solves or reduces one or more of the above-mentioned problems, there is provided a multi-function input/output device which comprises: a document input unit acquiring document data from a document; a document-input control setting unit controlling the document input unit according to unit-control-setting information of the document input unit; a document data processing unit processing the document data acquired by the document input unit; a document-data-processing control setting unit controlling the document data processing unit according to unit-control-setting information of the document data processing unit; a document data output unit outputting processed document data; a document-data-output control setting unit controlling the document data output unit according to unit-control-setting information of the document data output unit; an optical reading unit optically reading an optically readable code from a device control setting medium on which device control setting information, including use authentication information and at least one unit-control-setting information for the document input control setting unit, the document-data-processing control setting unit, and the document-data-output control setting unit, is recorded; a control setting information recognizing unit recognizing the device control setting information, including the use authentication information, from the optically readable code read by the optical reading unit; a user authentication unit authenticating a user by using a use authentication code of the use authentication information; and a setting processing unit setting at least one of the respective unit-control-setting information of the document input unit, the document data processing unit, and the document data output unit, based on a recognition result of the device control setting information and the use authentication information.

In an embodiment of the invention which solves or reduces one or more of the above-mentioned problems, there is provided a control method for a multi-function input/output device including a document input unit acquiring document data from a document, a document-input control setting unit controlling the document input unit according to unit-control-setting information of the document input unit, a document data processing unit processing the document data acquired by the document input unit, a document-data-processing control setting unit controlling the document data processing unit according to unit-control-setting information of the document data processing unit, a document data output unit outputting processed document data, a document-data-output control setting unit controlling the document data output unit according to unit-control-setting information of the document data output unit, the method comprising: optically reading an optically readable code from a device control setting medium on which device control setting information, including use authentication information and at least one unit-control-setting information for the document input control setting unit, the document-data-processing control setting unit, and the document-data-output control setting unit, is recorded; recognizing the device control setting information, including the use authentication information, from the optically read code; authenticating the user by using a use authentication code of the use authentication information; and setting at least one of the respective unit-control-setting information of the document input unit, the document data processing unit, and the document data output unit, based on a recognition result of the device control setting information and the use authentication information.

According to embodiments of the multi-function input/output device and method of the invention, the time and effort for the user to sets the image forming conditions and the network setting conditions to the multi-function input/output device can be reduced by using a device control setting medium. And the operability of input and output of document data can be improved. Moreover, the security of device control setting information is raised, and the ease of use of the device for the user is improved.

BRIEF DESCRIPTION OF THE DRAWINGS

Other objects, features and advantages of the present invention will be apparent from the following detailed description when reading in conjunction with the accompanying drawings.

FIG. 7 is a diagram showing an example of unit control setting information.

FIG. 8 is a flowchart for explaining operation in the embodiment 2 of the invention.

DETAILED DESCRIPTION OF PREFERRED EMBODIMENTS

A description will be given of embodiments of the invention with reference to the accompanying drawings.

Figure 1:
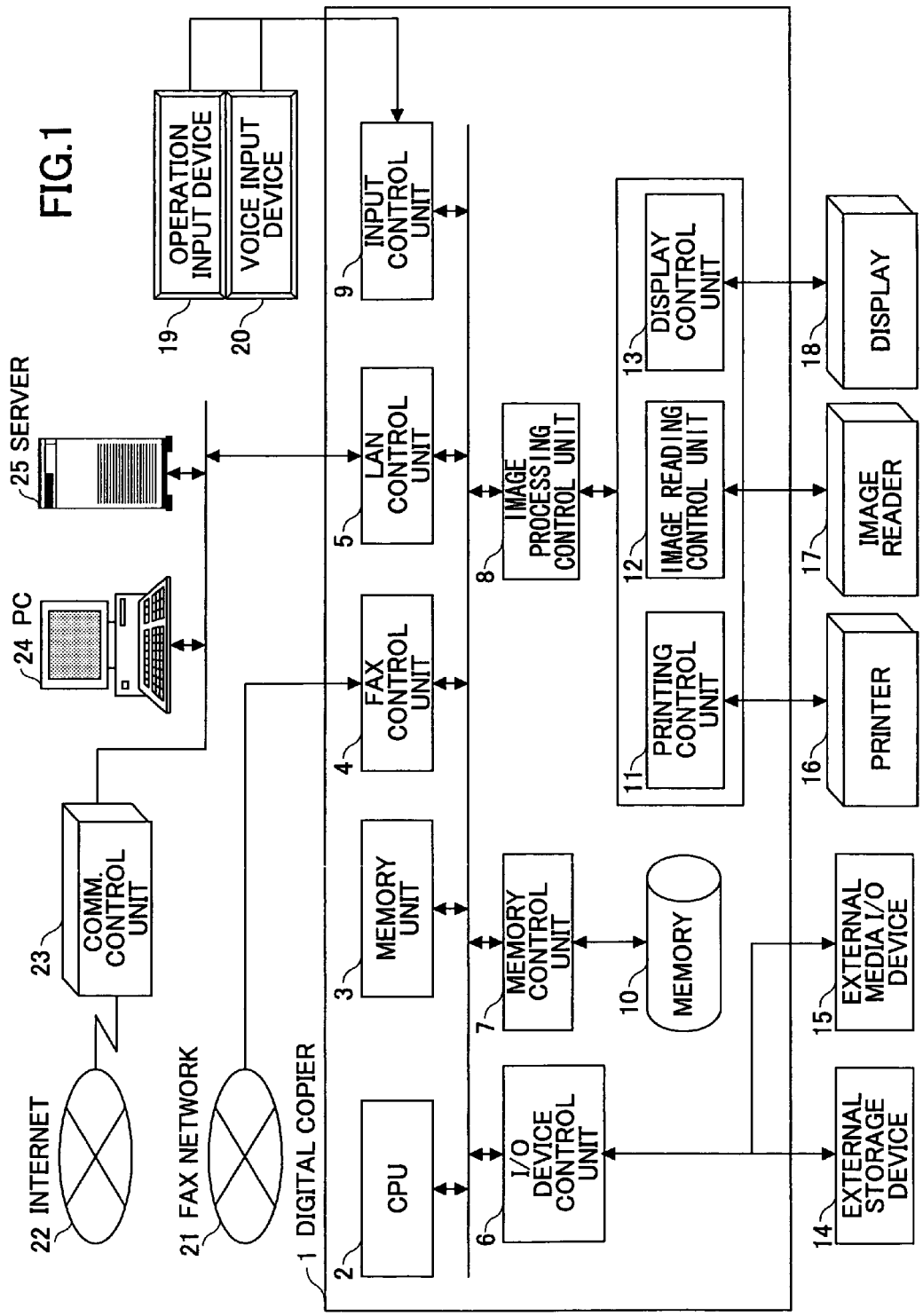
FIG. 1 is a block diagram showing the outline composition of a digital copier in the embodiment 1 of the invention.

FIG. 1 shows the composition of a digital copier in the embodiment 1 the invention. In the embodiment 1, the digital copier is given as an example of the multi-function input/output device according to the invention.

As shown in FIG. 1, the digital copier 1 comprises a CPU 2, a memory unit 3 (including a ROM, a RAM, etc.), a FAX control unit 4, a LAN control unit 5, an input/output device control unit 6, a memory control unit 7, an image-processing control unit 8, and an input control unit 9. The digital copier 1 further comprises a memory 10 (including a built-in hard disk drive (HDD) connected to the memory control unit 7), a printing control unit 11, an image reading control unit 12, and a display control unit 13. The units 11 to 13 are connected to the image-processing control unit 8.

The FAX control unit 4 performs transmission and receiving of facsimile data to and from an external facsimile through a FAX circuit 21. The LAN control unit 5 connects the digital copier 1 with an external device through a communications control unit 23 (such as a modem or a router) and through the Internet 22. And the LAN control unit 5 connects the digital copier 1 with a personal computer (PC) 24 or a server computer (server) 25 by cable or by radio. The LAN control unit 5 performs transmission and receiving of information to and from the PC 24 or the server 25.

The input/output device control unit 6 performs input/output of information from/to an external storage device 14 (such as an external HDD) or an external media I/O device 15 in which any of media, including multimedia card (registered trademark), smart media (registered trademark), memory stick(registered trademark), SD memory card (registered trademark), a CD-ROM, a floppy (registered trademark) disk, and a USB memory (registered trademark), is attached.

The image-processing control unit 8 performs input/output of information in association with any of a printer 16 (which is constituted by a laser printer, an ink-jet printer, etc. and adapted to perform monochrome, color, and double-sided printing) connected through the printing control unit 11, an image reader 17 (which reads a document image through optical processing) connected through the image reading control unit 12, and a display 18 (which is constituted by any of a touch panel, a CRT display, a liquid crystal display, etc.) connected through the display control unit 13.

The input control unit 9 is provided with an operation input device 19 including a touch panel and key buttons, and a voice input device 20 including a microphone. The input control unit 9 performs input operation with any of the touch panel and the key buttons pressed by the user or with the voice sent from the user through the microphone.

The CPU 2 controls the main part of the digital copier 1 in accordance with the control program stored in the memory unit 3. The CPU 2 controls the FAX control unit 4, the LAN control unit 5, the input/output device control unit 6, the memory control unit 7, the image-processing control unit 8, and the input control unit 9 in accordance with the processing program which is stored in the memory 10 and expanded in the memory unit 3, if needed.

In order to attain effective use, the digital copier of the embodiment 1 is provided to create and use a device control setting medium. The device control setting medium is an optically readable medium (such as a print sheet etc.) on which device control setting information for controlling the digital copier which is encoded is printed as a two-dimensional code.

Figure 2:
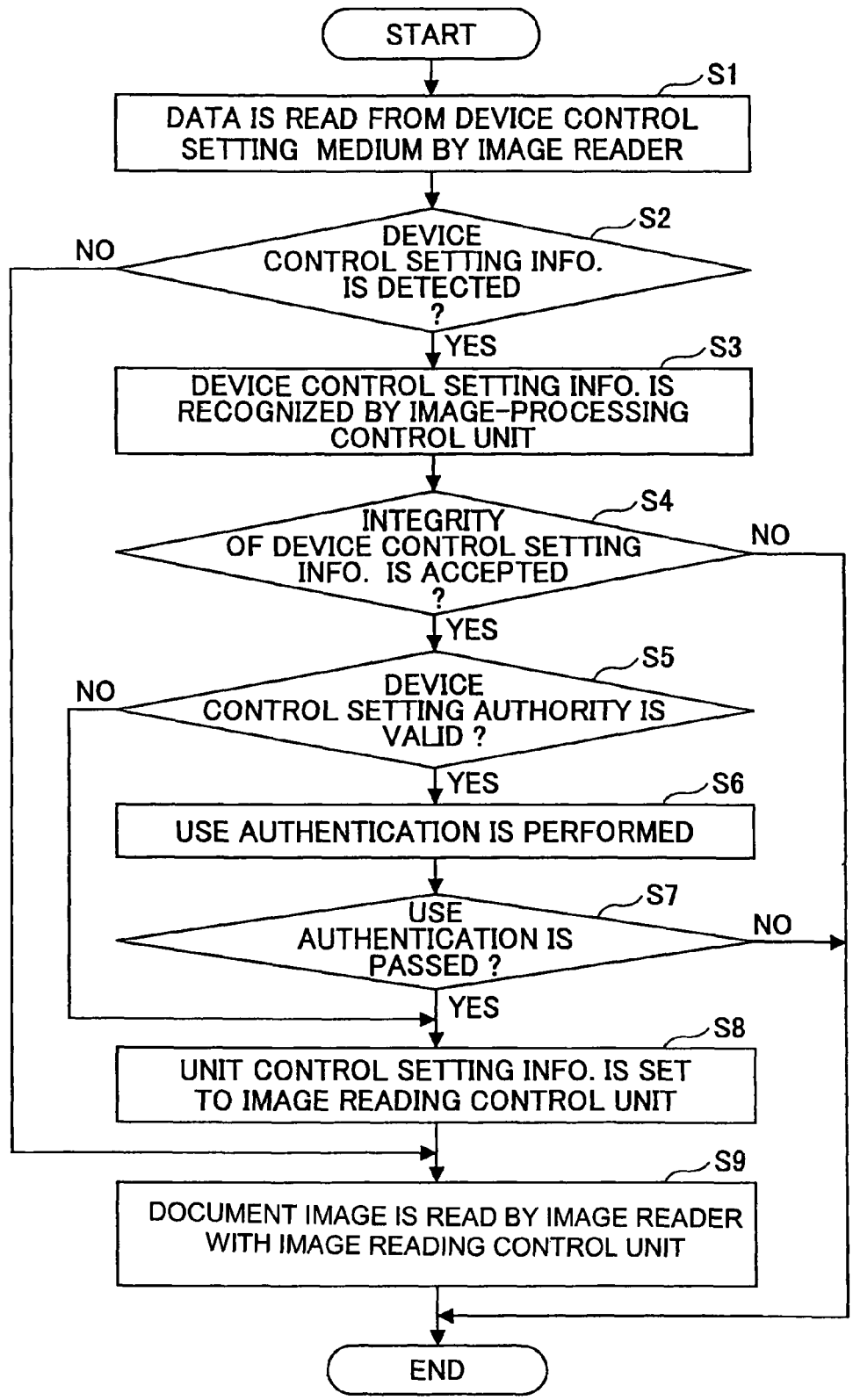
FIG. 2 is a flowchart for explaining a utilizing method of a device control setting medium in the digital copier in the embodiment 1 of the invention.

FIG. 2 is a flowchart for explaining a utilizing method of the device control setting medium in the digital copier in the embodiment 1 of the invention. The operation of the digital copier 1 will be explained with reference to FIG. 1 and FIG. 2.

Upon start of the processing of FIG. 2, the user on the digital copier 1 uses the image reader 17 provided in the digital copier 1, to optically read document data from a document (S1). The document (or the device control setting medium) is placed on the image reader 17 (or on the optical document reading glass thereof), and reading of document data from the document by the image reader 17 is started by a starting request inputted from the operation input device 19. The input control unit 9 transmits the input starting request to the CPU 2, this starting request requesting the image reader 17 to perform a reading operation to read document data from the document. In response to the request, the CPU 2 controls the image-processing control unit 8, so that control of the image reading control unit 12 is carried out. The image reading control unit 12 controls the image reader 17 appropriately, so that it reads the document data from the document and stores the data into the memory unit 3.

After the reading of document data is performed, the analysis of the read document data is performed by the image-processing control unit 8 (S2). On the device control setting medium which is used in the embodiment 1 and analyzed in step S2, device control setting information is printed using a two-dimensional code, such as QR Code.

Figure 3:
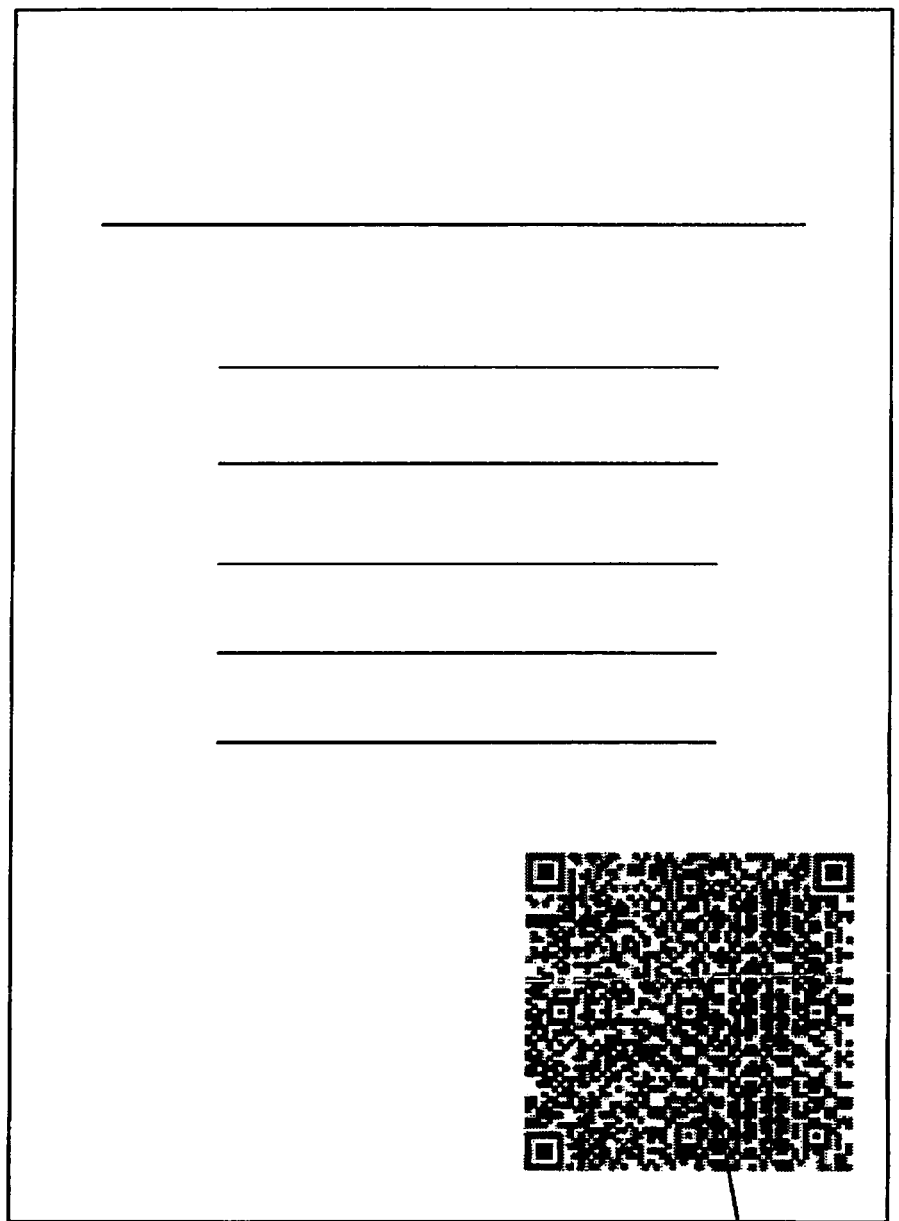
FIG. 3 is a diagram showing a device control setting medium used in the embodiment 1 of the invention.

Specifically, as shown in FIG. 3, the device control setting information is printed in a predetermined position of the device control setting medium (print sheet). And, in the step S2, the image-processing control unit 8 detects whether the device control setting information is contained in the document data.

When the device control setting information is not detected in the document data (No of step S2), it is determined that the optically read document is a normal document, and the normal document reading processing will be performed.

On the other hand, when the two-dimensional code of the device control setting information is detected in the predetermined position of the document data (Yes of step S2), the device control setting information is read and stored into the memory unit 3. And it is notified to the CPU 2 that the device control setting medium may be used as the optically read document.

Figure 4:
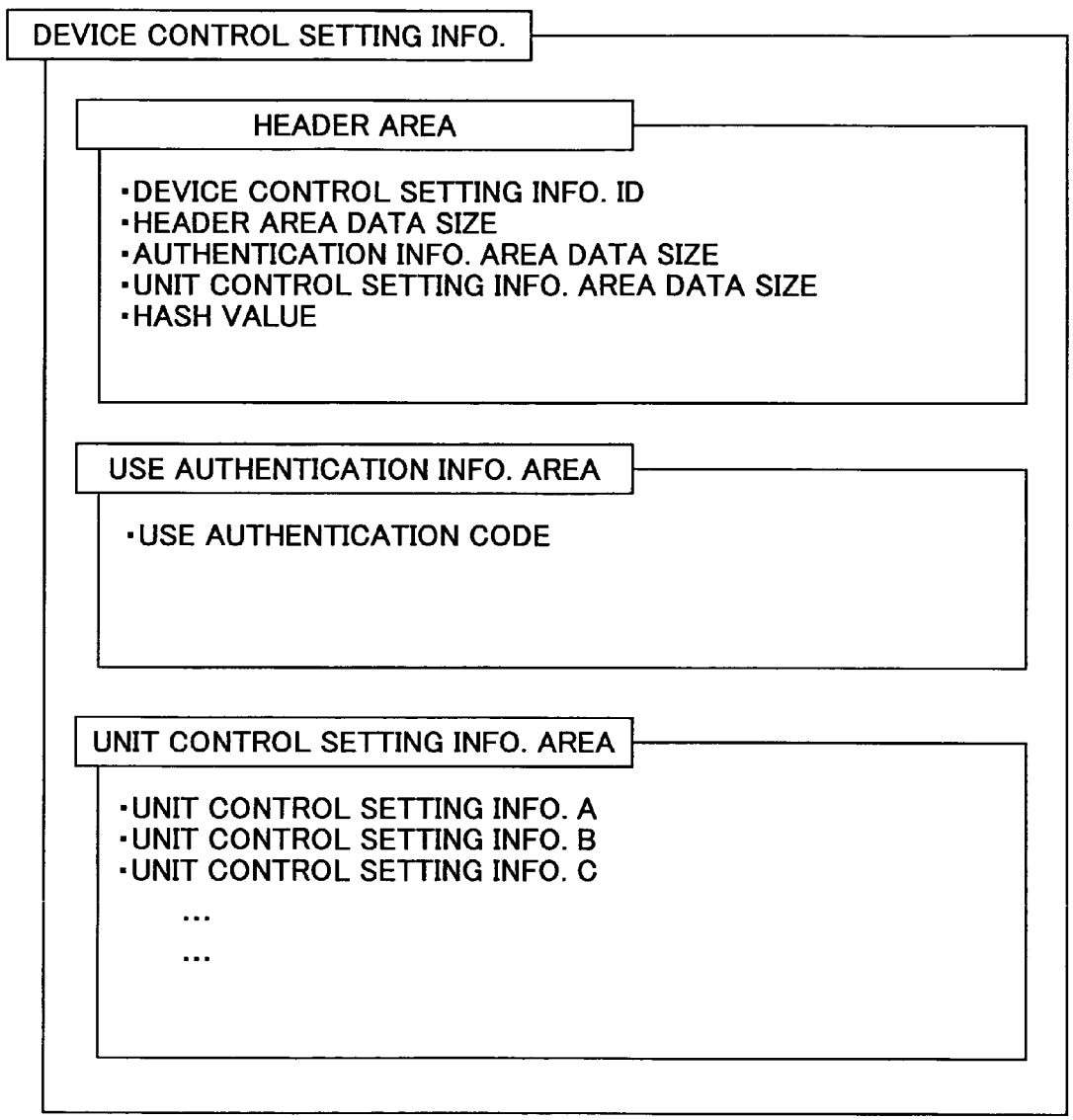
FIG. 4 is a diagram showing the composition of a device control setting information in the embodiment 1 of the invention.

After the notice is received, the CPU 2 performs the analysis of the two-dimensional code information (device control setting information) stored in the memory unit 3 (S3). As shown in FIG. 4, the device control setting information is constituted by a device control setting information header area, a use authentication information area, and a unit control setting information area.

Thus, the CPU 2 checks the portion of the stored data corresponding to the device control setting information header area, and detects whether the stored data portion matches the identifier of device control setting information.

After it is detected that the stored document data is derived from a device control setting medium, the CPU 2 checks a data size of the device control setting information in order to detect whether the integrity of the device control setting information is acceptable (S4).

To check the integrity, the CPU 2 uses the "data size of use authentication information area" and the "data size of unit control setting information area" which are contained in the device control setting information header area, and acquires the data in the use authentication information area and the data in the unit control setting information area. And the CPU 2 computes the hash value from the acquired data using the known hash function, such as MD5 (Message Digest 5) or SHA-1 (Secure Hash Algorithm 1). The CPU 2 compares the computed hash value with the "hash value of use authentication information area+unit control setting information area" which is contained in the device control setting information header area.

When the computed hash value is equal to the stored hash value, it can be judged that the device control setting information is correctly read without error.

The hash function generally is configured so that if the hash value A and the hash value B which are created from data A and data B using the hash function are different from each other, then the data A and the data B are different from each other. The integrity of the device control setting information can be checked using this hash value. Since the data of the hash value amounts to hundreds of bits at most, data integrity can be efficiently checked using the hash value, rather than multiplexing data.

After it is judged by the analysis of the device control setting information header area that the two-dimensional code information is the device control setting information, the CPU 2 checks use authentication information which is provided as authority of device control (S5). The use authentication information area in the device control setting information of FIG. 4 is provided in order to check if the user is authorized to execute the setting of the device control. The CPU 2 detects whether the data size of use authentication area contained in the device control setting information header area is the same as a predetermined size that is larger than 0. When the data size is the same as the predetermined size, it is determined that the device control setting authority of the user is valid.

When the device control setting authority is valid (Yes of step S5), the CPU 2 displays the message indicating that the device control setting authority is valid, on the display 18, and performs the use authentication (S6). To perform the use authentication, the password authentication using the hash function, may be used. In this case, when the authority of the device control setting in the use authentication information area is valid, the encoded password is embedded in the use authentication information area as a use authentication code. This encoded password is created by encoding a password (raw password), set up by the user, using the hash function.

The hash functions, such as MD5 and SHA-1, are tropism functions, and they are designed such that restoring the raw password from the encoded password is very difficult. Because of this feature of the hash function, encoding the raw password using the hash function and embedding the encoded password in the device control setting information can make it difficult for a third party to analyze the user's raw password.

When performing the use authentication, the user is requested to input the raw password, and the CPU 2 computes the encoded password from the raw password input by the user, using the hash function. The CPU 2 detects whether the encoded password computed from the user's input matches the encoded password contained in the use authentication information area (S7). When the match occurs, it can be judged that the use authentication is passed.

When the use authentication is passed (Yes of step S7), the CPU 2 interprets the unit control setting information in the device control setting information and performs setting of the unit control setting information in the related unit (S8). For example, the setting of the unit control setting information in the image reading control unit 102 is performed in this embodiment.

In addition, as shown in FIG. 4, two or more items of unit control setting information may be included in the unit control setting information area. Basically, the CPU 2 performs the setting of the items of unit control setting information sequentially from the unit control setting information item arranged at the head-end of the unit control setting information area. Alternatively, it is also possible to arrange a script which controls execution sequence and change the order of execution.

When reading an image from a document, the setting of unit control setting information in the image-processing control unit 8 and the image reading control unit 12 is performed, and the respective units are controlled to operate in accordance with this setup, so that an image is read from the document.

For example, the CPU 2 reads the unit control setting information A in the unit control setting information area, and recognizes that this information A is "image reading control unit setting: resolution=300 dpi". Since this information A specifies the image reading control unit 12 as an object unit, the CPU 2 detects whether the setting of "resolution" in the image reading control unit 12 is possible. If the setting item of "resolution" exists for the image reading control unit 12, the information of "300 dpi" is written to the setting item.

Next, the CPU 2 reads the unit control setting information B and recognizes that this information B is "image reading control unit setting: color mode=full color". Similarly, since this information B specifies the image reading control unit 12 as an object unit, the CPU 2 detects whether a setting item for the image reading control unit 12 exists. If the setting item exists, the setting information is written to the setting item.

And the CPU 2 reads the unit control setting information C and recognizes that this information C is "image reading control unit control: reading execution". When the control item is recognized, the CPU 2 chooses some operation one by one, and performs the document reading operation (S9).

In the above example, the device control setting medium is placed on the optical document reading glass. For this reason, the CPU 2 may be configured to display the display indication "set a reading document and press the start button" on the display 18 by using the display control unit 13, and to be in a waiting condition until the user's operation request is notified from the input control unit 9.

Alternatively, the CPU 2 may be configured so that, when the device control setting medium is placed on the automatic document reader, the CPU 2 automatically feeds the document placed next to the medium, and performs reading processing of the document based on the image reading conditions set up by the device control setting medium.

Figure 5:
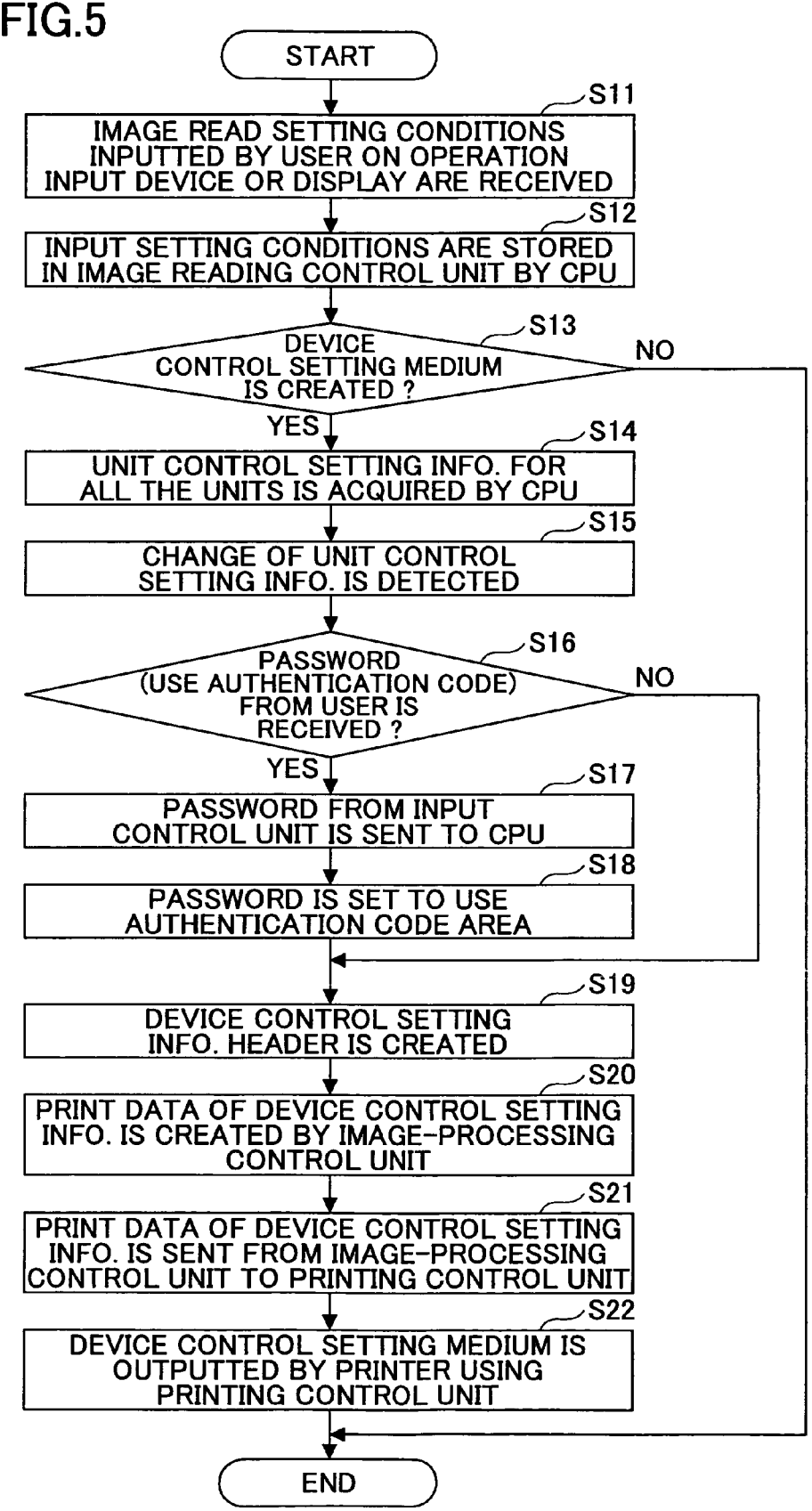
FIG. 5 is a flowchart for explaining a method of creating a device control setting medium in the embodiment 1 of the invention.

FIG. 5 is a flowchart for explaining a method of creating a device control setting medium in the digital copier in the embodiment 1 of the invention. This method will be explained with reference to FIG. 1 and FIG. 5.

Even when the user does not have a device control setting medium (see FIG. 3) which can be used to perform a desired control setting of the digital copier 1, the user is able to create a device control setting medium by using a certain method. In this embodiment, the method of outputting a device control setting medium containing the device control setting items which are set up when reading a paper document will be explained.

Suppose that the user places a paper document on the optical document reading glass, and sets up the reading conditions of the document by using the display 18 and the operation input device 19 of the digital copier 1 (S11). Suppose that "reading resolution: 300 dpi" and "color mode: monochrome" are set up as the document reading conditions.

The setting conditions are stored in the image reading control unit 12 by the CPU 2, and they are used when the document reading is performed (S12). After the setup of the document reading conditions is completed, the reading of a paper document is started by the user's reading start operation.

The input control unit 9 sends the notice of the reading start to the CPU 2 and the image-processing control unit 8, after the reading start operation is performed by the user on the operation input device 19. The image-processing control unit 8 sends the notice of the reading start to the image reading control unit 12, and controls the image reader 17 to read a paper document on the optical document reading glass, and stores the read document data in the memory unit 3.

On the other hand, the CPU 2 receives the notice of image reading start, and requests the user to select the output of a device control setting medium, and the setting of device control setting restriction by using the display control unit 13 (S13).

Figure 6:
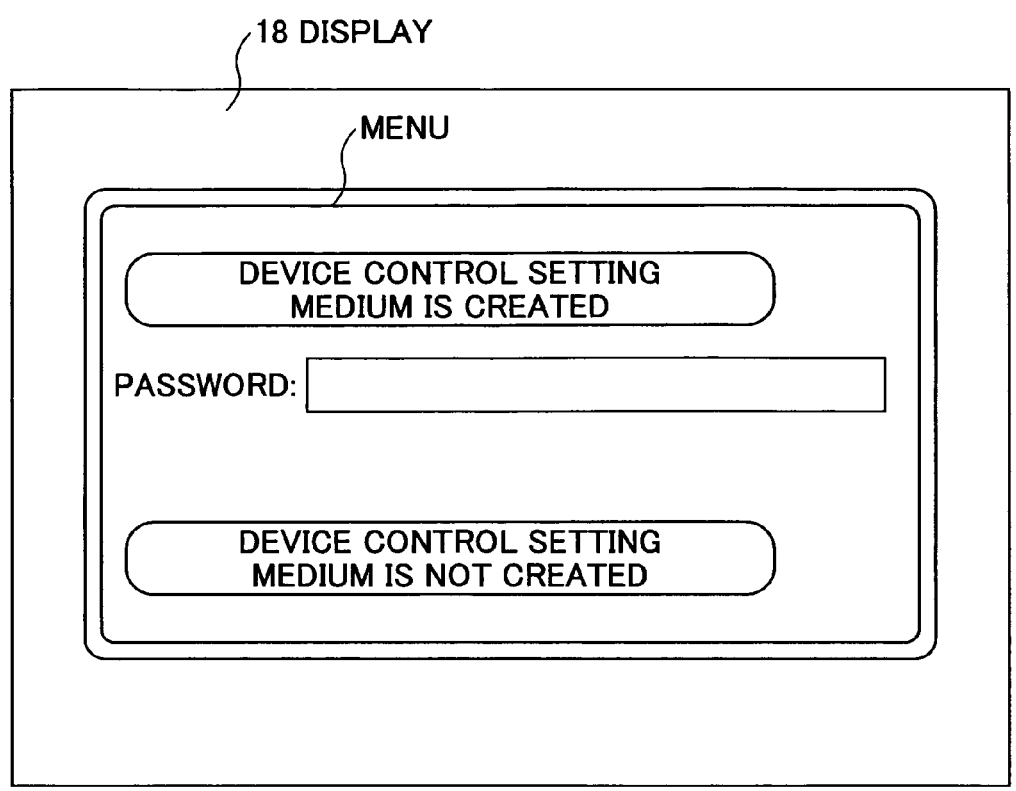
FIG. 6 is a diagram showing an example of display screen which requests creation of a device control setting medium in the embodiment 1 of the invention.

In this case, the user is requested to select one of the options by using the menu as shown in FIG. 6. The user may select one of the options: "creating a device control setting medium" and "not creating a device control setting medium" by pressing the corresponding button in the menu, and the user is requested to input a password in the menu.

With this menu, the existence of device control setting restriction is judged by using the method in which the device control setting restriction is validated if the input of the password is detected. A display time may be set up for this menu. In such a case, the default option is automatically set up and the display indication is eliminated if the display time has elapsed.

If "creating a device control setting medium" is chosen by the user, the CPU 2 requests all the connected units for the control setting information, and acquires the control setting information from the connected unit (S14).

The CPU 2 detects the portion changed from the default value in the unit control setting information which acquired all the acquired unit control setting information as compared with the default value list of all the unit control setting information stored in memory 10 (S15).

If the changed unit control setting information is detected, this unit control setting information is changed into the code for adding to device control setting information, and the CPU 2 stores it in the unit control setting information area of device control setting information.

As mentioned above, in this example, a setup of "reading resolution: 300 dpi", "color mode: monochrome", and others is performing reading execution in the default state.

If the changed unit control setting information is updated and it finishes storing unit control setting information altogether, "image reading control unit control: reading execution" will be stored as the following unit control setting information, and creation of a unit control setting information area will be ended.

Next, it is checked whether in the menu shown in FIG. 6, the password is entered via the input form of a password (S16).

When the password is entered (Yes of step S16), this password is transmitted to the CPU 2 from input control unit 9 (S17), and this is stored in a use authentication information area (S18).

At this time, a password may be enciphered using the hash function of MD5 or SHA-1 grade, and, thereby, security can be raised further.

Since the creation for a data division (a unit control setting information area, a use authentication information area) of device control setting information is completed by the processing so far, the remaining device control setting information header areas are created (S19).

First, the data of a use authentication information area and a unit control setting information area is gathered, the hash value is computed using the hash function of MD5 or SHA-1 grade, and this is stored in a device control setting information header area as "the hash value of use authentication information area+unit control setting information area".

Next, "the data size of a header area", "the data size of a use authentication information area", and "the data size of a unit control setting information area" are computed, and these are stored in a device control setting information header area.

Finally, creation of device control setting information is completed by storing "the identifier of device control setting information".

This "identifier of device control setting information" contains the version of this device control setting information, and how to treat while showing that this information is device control setting information.

After creation of device control setting information is completed, the CPU 2 transmits the output requirement of this device control setting information and this information to image-processing control unit 8.

The image-processing control unit 8 which received the output requirement is changed into the medium which can optical read device control setting information for a two-dimensional code etc. at the form in which an output is possible, and creates the device control setting information for an output (S20).

And the device control setting information for an output is transmitted to printing control unit 11 from image-processing control unit 8 (S21), and a device control setting medium is created with outputting from the printer 16 using printing control unit 11 (S22).

The device control setting information on the embodiment 1/the concrete control setting of each unit which processes an input/output, and the output to the paper by "printing execution" can be included as unit control setting information.

The setting of unit control information can be performed by adding "concentration/fractionation setup" of the unit control setting information about the printer 16 shown in FIG. 1, "double-sided printing setup", "sorting setup", "paper-size setup", etc.

A document data output setup to the display screen by "display screen" can be included as unit control setting information, and the identification of the acquired document data etc. can carry out, without performing printing to a paper document etc. An output setup of the document data based on "e-mail transmission" can be included as unit control setting information.

The acquired document data can be automatically transmitted by e-mail by specifying "transmitting address setup", "text setup", "title setup", etc. of the unit control setting information related to the LAN control unit 5 shown in FIG. 1.

The setup of the output node to which the document data is outputted by the "file transmission" can be contained as unit control setting information. The "transmission node path setup" in the unit control setting information related to the LAN control unit 5 shown in FIG. 1 is specified, and the file of the acquired document data can be automatically transmitted to the information processing device (such as the PC 24 or the server 25) connected through the network, such as LAN and the Internet.

The output setup of the document data based on "fax transmission" can be included as unit control setting information. Document data can be automatically transmitted using FAX circuit 21 by specifying information, including "transmitting number setup" of the unit control setting information about FAX control unit 4 shown in FIG. 1, "receiver's address setup", "transmission node address setup", etc.

An output setup of the document data based on "storage to memory" can be included as unit control setting information, and document data can be saved at memory 10 by specifying information, including "storage path setup" etc. of the unit control setting information about memory control unit 7 shown in FIG. 1.

The output setup of the document data based on "storage to an external storage device" can be included as unit control setting information. By specifying information, including "storage path setup" etc. of the unit control setting information about input/output device control unit 6 shown in FIG. 1, using external media I/O device 15, document data can be saved at a removable media, or storage of the document data to external storage device 14 connected using connecting unit, such as USB, can be performed automatically.

The file generation condition setup by "file type setup" can be included as unit control setting information.

The file type at the time of creating a file can be automatically set up from the data of the document read optically, by specifying a file type like "JPG form" and "PDF form" using the unit control setting information about the processing performed by the CPU 2 shown in FIG. 1.

The input setup of the document data based on "the document input from an external storage device" can be included as unit control setting information. Specifying the location of document data using the information on the "document acquisition former path" etc. of the unit control setting information about input/output device control unit 6 shown in FIG. 1. Using external media I/O device 15, document data can be acquired from a removable media, or acquisition of the document data from external storage device 14 connected using the connecting unit, such as USB, can be performed automatically.

The input setup of the document data based on "document input from memory" can be included as unit control setting information. By specifying the location of document data using the information on the "document acquisition former path" etc. of the unit control setting information about memory control unit 7 shown in FIG. 1, the data stored in memory 10 is automatically acquirable as a document input.

The input setup of the document data based on "the document input from a network" can be included as unit control setting information. By specifying the location of document data, document data is automatically acquirable from the information processing device (the PC 24 or the server 25) which is connected using the information on the "document acquisition former address" etc. of the unit control setting information about LAN control unit 5 shown in FIG. 1.

And two or more each setup which is described above can be included in the device control setting information in the embodiment 1 again. For example, it explains using the unit control setting information on the unit control setting information area in device control setting information as shown in FIG. 7.

Since the address of the input document is set as LAN control unit 5 and "document input from network" is set up as control, document data is acquired from on a network by setting up and performing these.

Next, since "monochrome image" is specified as a document data processing setup, this setup is reflected in image-processing control unit 8.

As a setup of an output, "storage to an external storage device" and "e-mail transmission" are set up, and the "storage path" corresponding to these and the "address" are set up, respectively.

The image processing of monochrome image can be performed to document data by performing processing based on the setup, and storage to the specification place of a "storage path" and e-mail transmission at the specification place of an "address" can be performed automatically after that.

Next, the embodiment 2 of the invention will be explained. Similar to the above-mentioned embodiment 1, this embodiment is characterized in that a password is added to a device control setting medium in order to raise the security. In a case of a recent multi-function input/output device, an indefinite number of users may use the device. For this reason, it is necessary to restrict the functions of the multi-function input/output device that can be used by a specific user, or it is necessary to inhibit the use of the functions by a non-authorized user.

A recent multi-function input/output device is provided such that the use of the functions of the multi-function input/output device are restricted or inhibited, and the individual control setting items are created as service conditions for every user. And the user is requested to perform a password authentication and a logging in. With the multi-function input/output device, the user is able to use an individual address book etc. under this environment. In order to use the functions of the multi-function input/output device, the user must input a password etc. and must perform logging in to the device.

Also when a device control setting medium is used in the above-mentioned environment, the user must perform the password authentication in order to use the functions of the device. Although the security is improved, the input operation to input the password becomes troublesome work for the user.

The embodiment 2 of the invention is provided for eliminating the problem. FIG. 8 is a flowchart for explaining authentication operation in the embodiment 2 of the invention.

Upon start of the processing of FIG. 8, it is detected whether logging in by an arbitrary user is active (S25).

When the logging in is not active (No of step S25), the user is requested to input the password recorded in the device control setting medium (S27).

When the logging in is active in step S25 (Yes of step S25), it is detected whether the user who logs in is an authorized user of the device control setting medium who is registered in the device control setting medium (S26).

When the user concerned is the authorized user of the device control setting medium (Yes of step S26), the use of the device control setting medium is permitted and the setting of the device control setting information stored therein is performed (S29).

When the user concerned is not the authorized user of the device control setting medium (No of step S26), the user is requested to input the password stored in the device control setting medium (S27). And the use authentication is performed with the password entered in step S27 (S28).

When the use authentication in step S28 fails, the processing of FIG. 8 is ended without performing the above-mentioned step S29.

When the logging in by the user is not active (No of step S25), the user is requested in the step S27 to input the password stored in the device control setting medium. Alternatively, it may be configured such that the user who logs in is requested to input both the user name and the password at this time.

If the user who logs in is the authorized user of the device control setting medium, it is no longer necessary for the user to keep in mind or re-input the password stored in the device control setting medium. This makes the convenience for the user increase.

In order to perform the processing of FIG. 8, it is necessary to register the authorized user of the device control setting medium in advance at the time of creating the device control setting medium.

For example, an authorized user registration area is provided in the use authentication information area shown in FIG. 4, and the user who is authorized to use the medium is registered therein. At this time, it may be provided so that two or more users are registered as a group unit which covers the users according to the affiliation or authority.

Moreover, the multi-function input/output device of the invention may be provided with a registering unit which allows the user to register individual device control setting information that is frequently used by the user. The registering unit may be provided in the digital copier 1 so that an individual device control setting screen is displayed on the display 18 after the use authentication is passed through the processing of FIG. 8.

For example, individual device control setting information "scanning execution (full-color, PDF, OCR, 300 dpi resolution)" is contained in the displayed screen and the user can select it as the frequently used device control setting. Or, a user's individual address book, including a set of frequently used e-mail addresses, is contained in the displayed screen as the individual device control setting information and the user can select it as the designation of image transmission. With the use of the above configuration, it is not necessary for the user to keep in mind or re-input the device control setting information, thereby further increasing the convenience for the user.

When two or more sheets of documents are read and processed using the automatic document reader, it is desirable that processing A is performed for pages 1 to 10 of the documents and the processing A is changed to processing B, and the processing B is performed for pages 11 to 20 of the documents. In such a case, it becomes possible by setting on the automatic document reader two or more device control setting mediums are inserted between the sides of the documents, as shown in FIG. 9.

Figure 9:
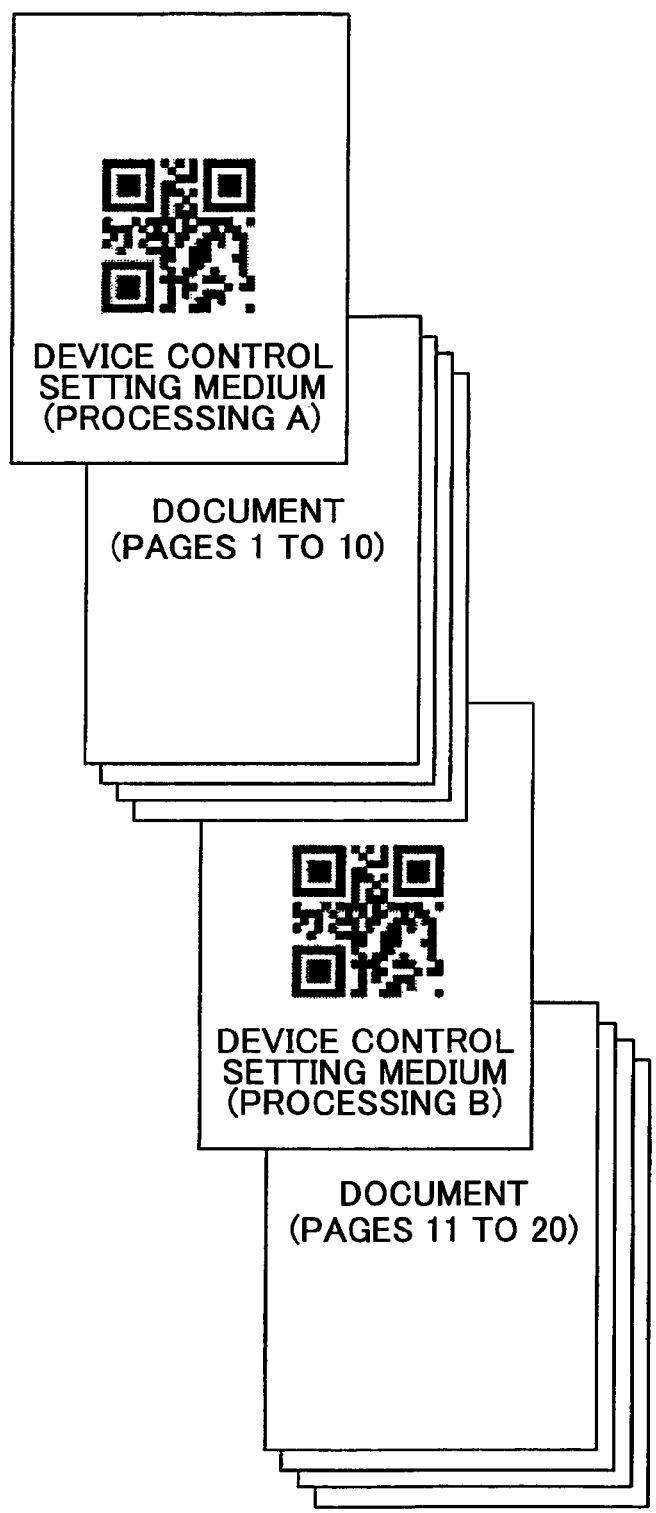
FIG. 9 is a diagram showing a device control setting medium and an object document in the case of performing two or more kinds of processing.

However, after processing A shown in FIG. 9 is completed, in order to perform processing B succeedingly and to perform a device control setup of a device control setting medium, authentication with a password is needed again and it becomes very troublesome work for the user.

Figure 10:
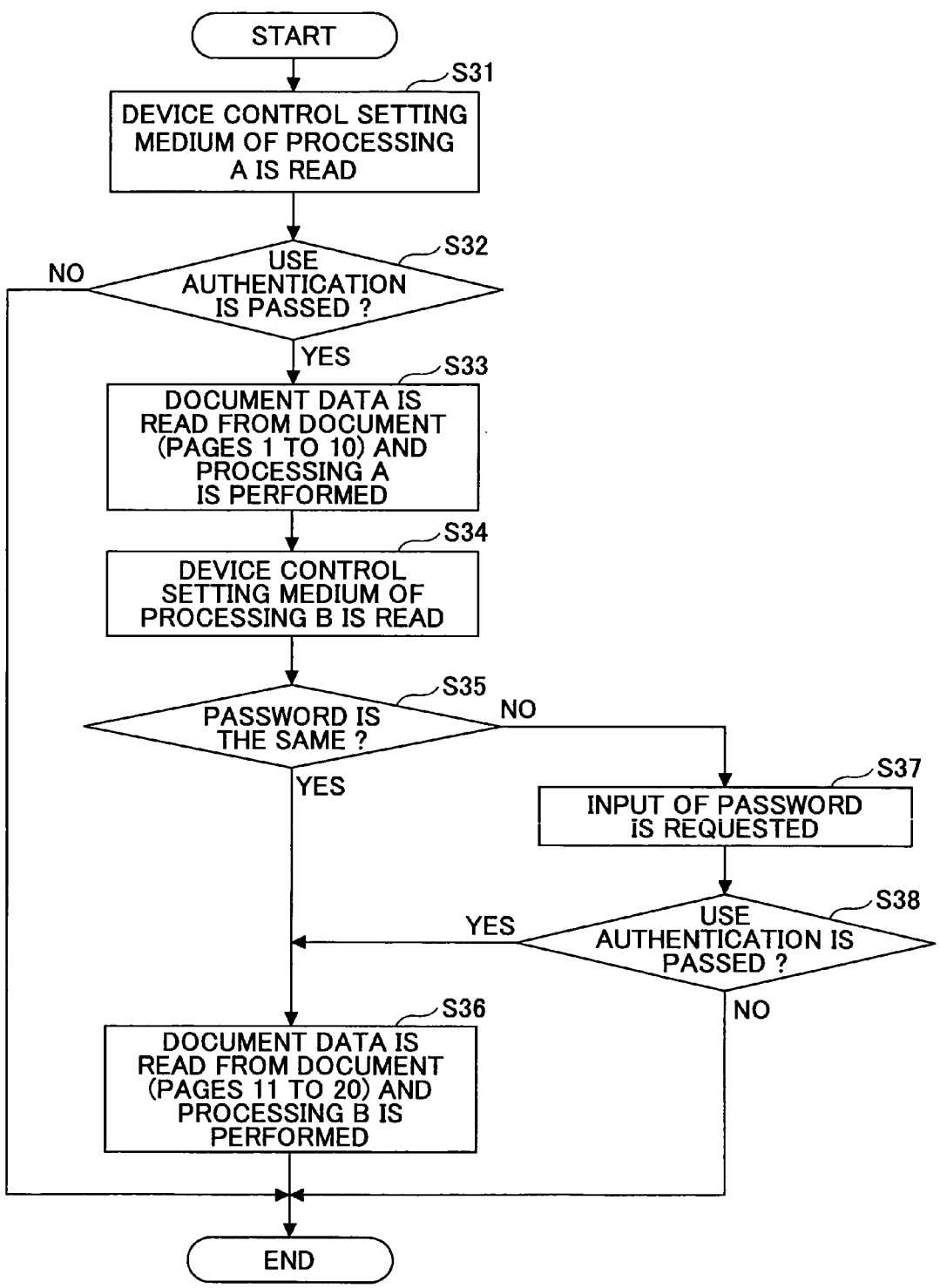
FIG. 10 is a flowchart for explaining operation in the case of performing two or more kinds of processing.

Operation will be explained referring to the flowchart of FIG. 10 for the composition for solving the problem.

First, in the multi-function input/output device, the device control setting medium by which the control setting of processing A is stored is read (S31).

Authentication with the password stored by the device control setting medium is performed (S32).

The processing is ended when the authentication fails (No of step S32).

When authentication succeeds in step S32 (Yes of S32), based on the device control setting information on processing A, the following document is read and processing A is carried out (S33).

The device control setting medium by which processing B is stored is succeedingly read after termination of processing A (S34). It is detected whether the read password is the same as what is stored by the device control setting medium of the above-mentioned processing A (S35). The input of a password is required when the password is different (No of step S35) (S37).

When the password is the same (Yes of step S35), based on the device control setting information on processing B, the following document is read and processing B is carried out (S36).

According to the request of step S37, the password of an input and the password stored by the device control setting medium of processing B are authenticated (S38). The processing is ended when the authentication fails (No of step S38).

When the authentication is successful in step S38 (Yes of step S38), the change processing B is carried out to step S36.

As described above, according to the embodiment 2, if the password is the same as stored to the device control setting medium, the user is not requested repeatedly to input his password, and it is possible to improve the ease of use for the user.

Alternatively, it may be checked that the password which logged in step S25 shown in FIG. 8 mentioned above, and the password stored by the device control setting medium of processing A and processing B are in agreement, and in the case of the same password, and performing a series of processing is continued.

Next, the embodiment 3 of the invention will be explained. In the above-mentioned embodiment 1, with plaintext, the device control setting information stored to a device control setting medium is got blocked, is simply changed into the two-dimensional code (for example, QR Code), and it is stored to the information on the device control setting medium.

Then, in the embodiment 3, like the case where the above-mentioned use authentication code is enciphered, encryption processing of the device control setting information is carried out, and it changes into a two-dimensional code etc., and it records on a device control setting medium, and creates.

For example, the device control setting information header area shown in FIG. 4 is stored with plaintext, and the information on other areas is enciphered and stored.

And the flag of whether it stored as plaintext or to have stored as a cryptogram is prepared for a device control setting information header area.

And when device control setting information exists in step S2 in FIG. 2, based on the above-mentioned flag, a cryptogram or plaintext is detected by the next step S3, and, in the case of a cryptogram, it is made to process decryption.

By making it a cryptogram like the embodiment 3, even if it is able to prepare the tool which can read a two-dimensional code (QR Code), it becomes impossible to get to k what kind of setup is recorded easily, and security can be raised.

The embodiment 4 of the invention will be explained. As the above-mentioned embodiment 1, the device control setting information is stored in a two-dimensional code on the device control setting medium, but since this information is recorded in two-dimensional code, even if the user looks at a device control setting medium, it may not understand anymore what kind of setup is carried out.

Then, in the embodiment 4, some contents of a setting are automatically added on a device control setting medium as information from which the contents of a setting become clear, and a device control setting medium is created.

Figure 11:
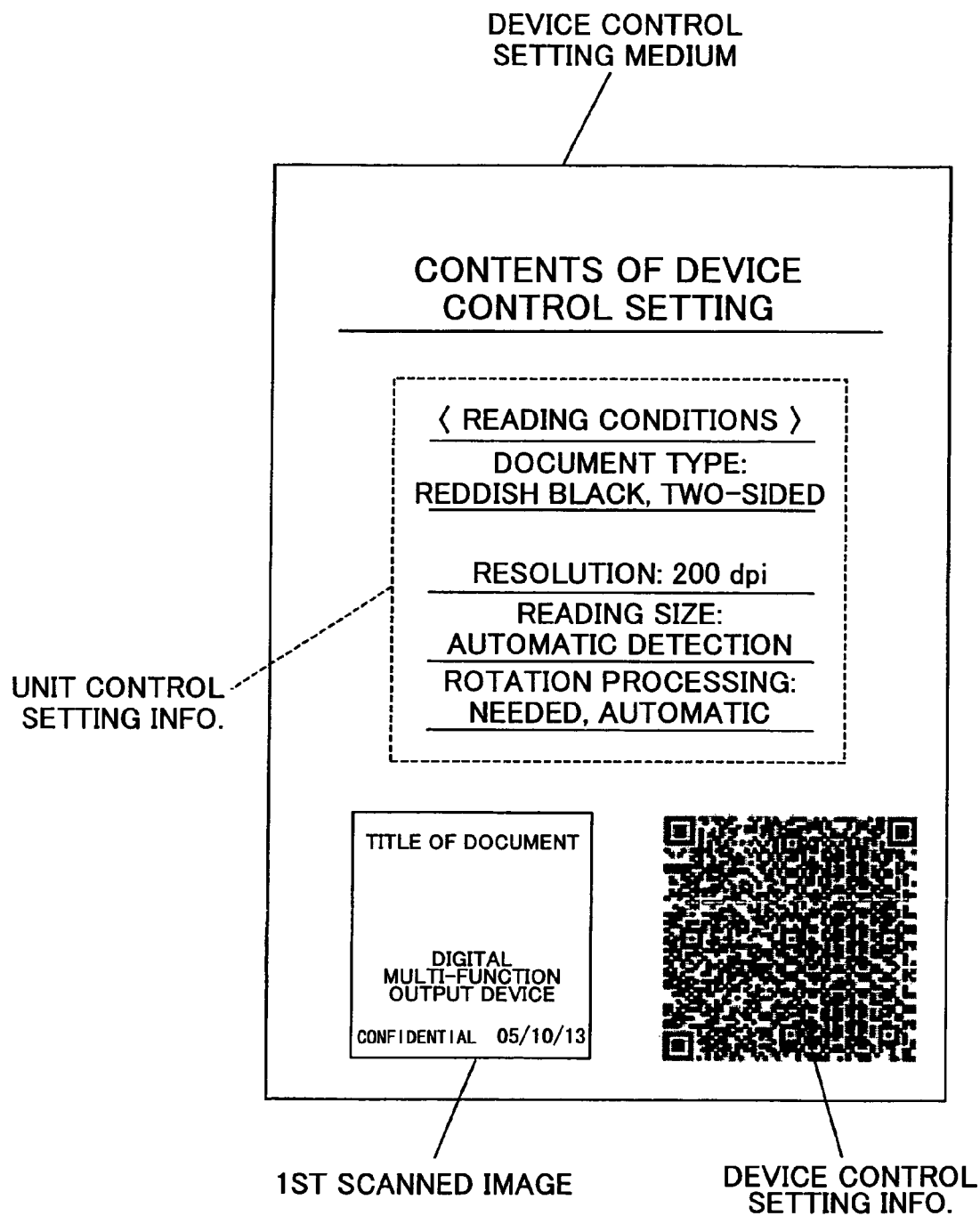
FIG. 11 is a diagram showing an example in which a part of device control setting information on a device control setting medium is displayed in a visible manner.

For example, the device control setting medium by which the user enabled decipherment of some contents of a setting which indicated the device control setting information (lower right) which carried out two-dimensional coding to be unit control setting information and a scanned image (lower left) of the 1st sheet like the device control setting medium shown in FIG. 11 is created.

The CPU 2 shown in FIG. 1 uses the setup which the user performed, and the conversion table (unit control setting information and keyword (correspondence list of a document kind, a resolution, a reading size, etc.)) in the memory 10. The keyword corresponding to unit control setting information is extracted, and image-processing control unit 8 is passed.

The image-processing control unit 8 adds the setup of the keyword which corresponds with the device control setting information saved as a two-dimensional code to the device control setting medium.

Thus, by adding the contents of a setting to a device control setting medium, the user can check in visible a part of information set as the device control setting medium, and it becomes possible to use a device control setting medium efficiently.

Next, the embodiment 5 of the invention will be explained. In the latest digital copier, it has the function to register a setup into a button which is called a one-touch button so that various setup, such as reading conditions and a file transmission place, can be called immediately.

The history button which can choose the history of the processing result of several affairs performed in the past is also prepared, and the function in which the control setting of the run time can be called immediately is also offered.

In the embodiment 5, when it is the device which has the above functions, a device control setting medium is read and the device control setting information stored is created as a one-touch button which is the starting unit automatically mentioned above.

By carrying out registration storage of the device control setting information as registration setting of control information at the memory unit in the device, it becomes possible to enable it to call the setting of control always.

When the device control setting information used for the processing for which using this registration setting of control information is requested is the same, it becomes unnecessary to read a device control setting medium at every time, and device control setting information can be set as it.

This is realizable because operation to steps S1-S4 shown in FIG. 2 uses a one-touch button.

It is also possible to create a device control setting medium from the registration setting of control information already registered into the memory unit as a one-touch button.

In step S11 shown in FIG. 5, the device control setting information can be inputted from the registered registration setting of control information only by choosing a one-touch button instead of the user inputting device control setting information manually.

When the information and the information "use authentication code is set up" or "device control setting medium is created" are registered into the setup of the one-touch button as another function, the one-touch button can realize operation in the steps S11 to S19 of FIG. 5.

However, the setup of the use authentication code shall newly require the input of the use authentication code, using the use authentication code which authenticated the user with the digital copier.

Although the setting of control information concerning one use authentication code and one unit is stored in the device control setting information of the above-mentioned embodiment in the use authentication information area and unit control setting information area which are shown in FIG. 4. The setting of control information concerning two or more use authentication code and two or more units is stored, and it may be made to perform two or more combination.

In the use authentication code, that from which authentication ranking differs is stored and selection of the unit control setting information according to each use authentication code can also be enabled. In reading of one device control setting medium, different device control setting information according to the authentication ranking of the authenticated use authentication code can be chosen.

Next, the embodiment 6 of the invention will be explained. As mentioned above, in execution of device control setting information, user authentication using the use authentication information is carried out, and processing in which execution of device control setting information is interrupted when authentication cannot be acquired is performed. According to this order of the real way, it can restrict that the user who does not pass authentication uses a device control setting medium.

However, when performing the actual authentication mentioned above, two or more security levels are set up according to the user's authority, the device control which can be used according to this level is changed, and the demand for increasing the security according to each one of authority exists.

For example, although anyone can perform reading processing with the scanner (image reader) of a document, it is a case so that it may say that other men cannot perform processing of e-mail transmission in which the transmitting address is registered.

In order to satisfy the demand, two or more use authentication codes are held to device control setting information, and operation of changing the security level of the device control which can be performed according to this use authentication code is needed.

Next, the execution processing of the device control setting medium will be explained using the flowchart shown in FIG. 12. This flowchart is provided to replace steps S6 and S7 shown in FIG. 2.

First, the use authentication information area of the device control setting information shown in FIG. 4 is read from the read device control execution medium, and all the use authentication codes are added to authenticator list L1 (for example, it holds in the memory 10 grade of digital copier 1 shown in FIG. 1) (S41).

The unique ID (authentication ID) for specifying a certain use authentication code out of two or more use authentication codes is set to this use authentication code. If reading of the use authentication code is completed, the menu will be displayed on the display 18 and the user will be requested for the input of use authentication (S42).

When the input of the use authentication code from the user is checked (S43) and it is able to be checked that the input had been obtained (Yes of step S43), it is checked whether the use authentication code by the user input is contained in authenticator list L1 (S44).

When it is checked that the use authentication code by the user input is contained in authenticator list L1 (Yes of step S44), authentication ID of the use authentication code which is in agreement from authenticator list L1 is acquired, and this is stored as "authentication ID: USER" (S45).

Next, processing which extracts the unit control setting information which can be performed by the use authentication code by the user input is performed.

The setting of unit control information is taken out from the device control setting information (S46), and it is checked whether this is related with "authentication ID: USER" (S47).

When it is related (Yes of step S47), the taken-out unit control setting information is added to the unit control execution list L2 (which is stored in, for example, the memory 10 of the digital copier 1 shown in FIG. 1) which forms the user's individual control setting items (S48).

Since it is the unit control setting information which cannot be used by the authority of use authentication of "authentication ID: USER" when there is no correlation (No of step S47), it does not add to unit control execution list L2.

Then, when checking whether the unit control setting information that it does not judge remains (S49) and remaining in device control setting information, (Yes of step S49) and the remaining unit control setting information are returned and judged to step S46.

If it finishes judging all unit control setting information (No of step S49), the authentication processing will be ended (to step S8 shown in FIG. 2), and will register the unit control execution list L2 as unit information set up in step S8.

When the input of the user's use authentication code is not checked (No of step S43), or when the use authentication code by the user input is not contained in authenticator list L1 (No of step S44), it is checked whether authentication ID to which use is permitted without use authentication is registered into device control setting information (S50).

When it is checked (Yes of step S50), authentication ID without use authentication is stored as "authentication ID: USER" (S51) and processing after step S46 is performed.

When it is not able to be checked (No of step S50), the use of the device control setting medium is ended as authentication processing failure.

The device control setting medium which specifically associated unit control setting information and two or more use authentication codes as follows will be used.

Figure 13:
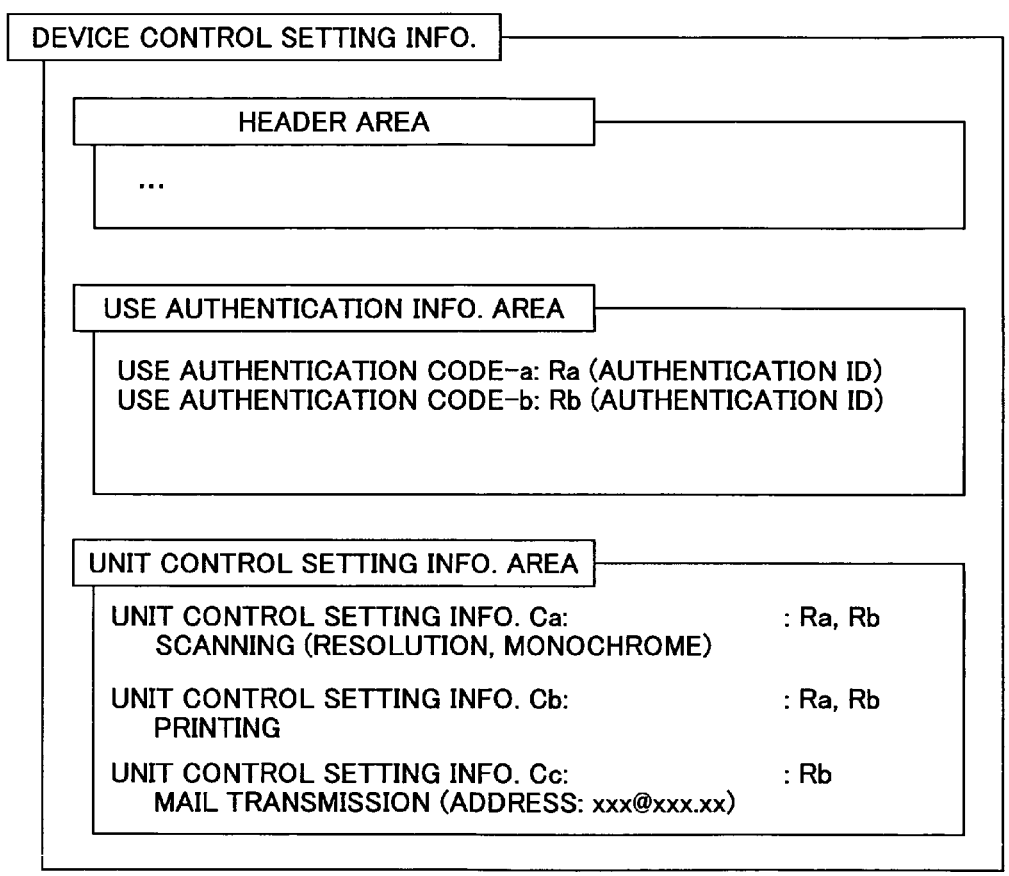
FIG. 13 is a diagram showing the composition of a device control setting information in the embodiment 6 of the invention.

Suppose that, in the device control setting medium shown in FIG. 13, the following unit control setting information is registered Ca: scanning (maximum resolution, monochrome)
Cb: printing
Cc: e-mail transmission (address: xxxx@xxx.xx).
In this case, the user of low authority level is permitted to perform the unit control of Ca and Cb. However, the e-mail transmission of Cc can be performed only by the user of high authority level.

Since two kinds of security levels are needed for the above-mentioned setup, two use authentication codes are stored in the device control setting medium (use authentication code a, use authentication code b). The authentication ID of use authentication code a is "Ra", and the authentication ID of use authentication code b is "Rb".

Correlation of a security level and a use authentication code is carried out as follows. An additional area for storing correlation of the security level and the use authentication code is added in a unit control setting information area. In order to enable use of unit control setting information of each of Ca and Cb for both the authentication IDs Ra and Rb, the use authentication codes Ca and Cb are stored with both the authentication IDs Ra and Rb as the correlation. In order to enable use of unit control setting information Cc only for the authentication ID Rb, the use authentication code Cc is stored only with the authentication ID Rb.

Thus, a security level can be easily set up by performing correlation of unit control setting information and a use authentication code.

Figure 14A:
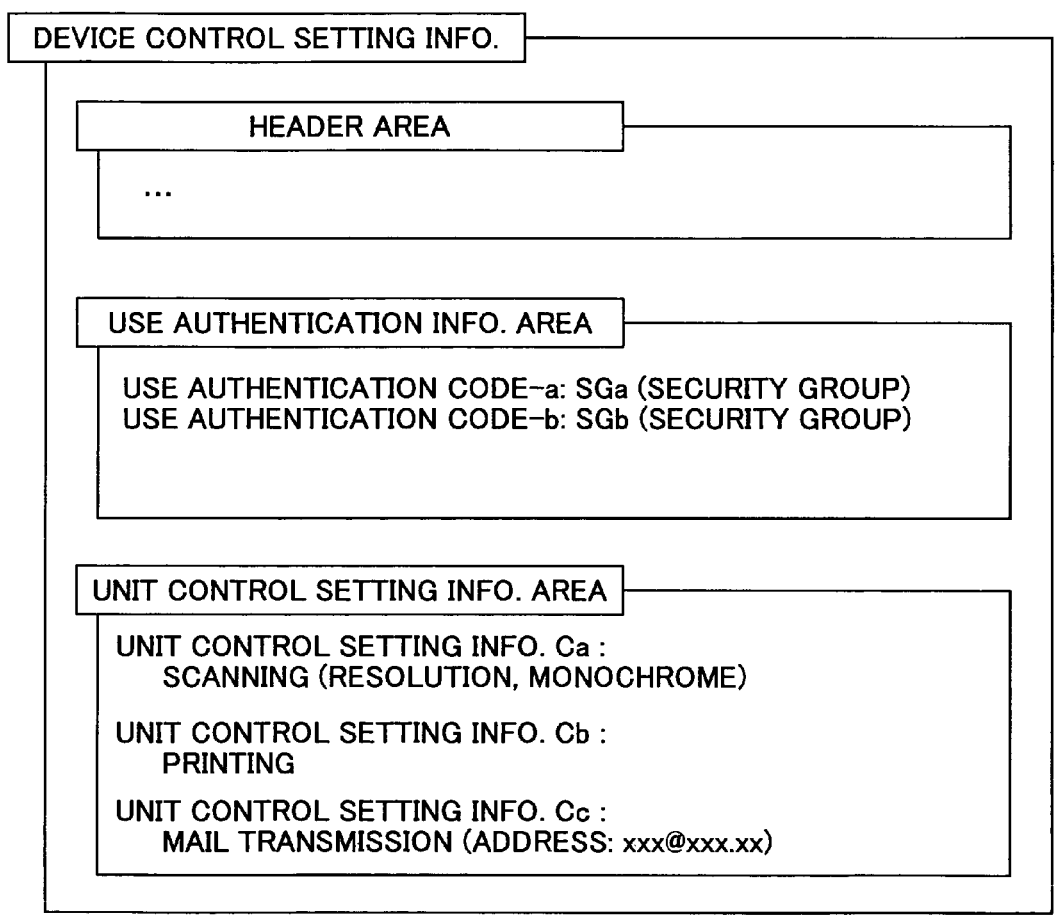
FIG. 14A and FIG. 14B are diagrams showing the relation of the security group of the device control setting information in the embodiment 6 of the invention.
Figure 14B:
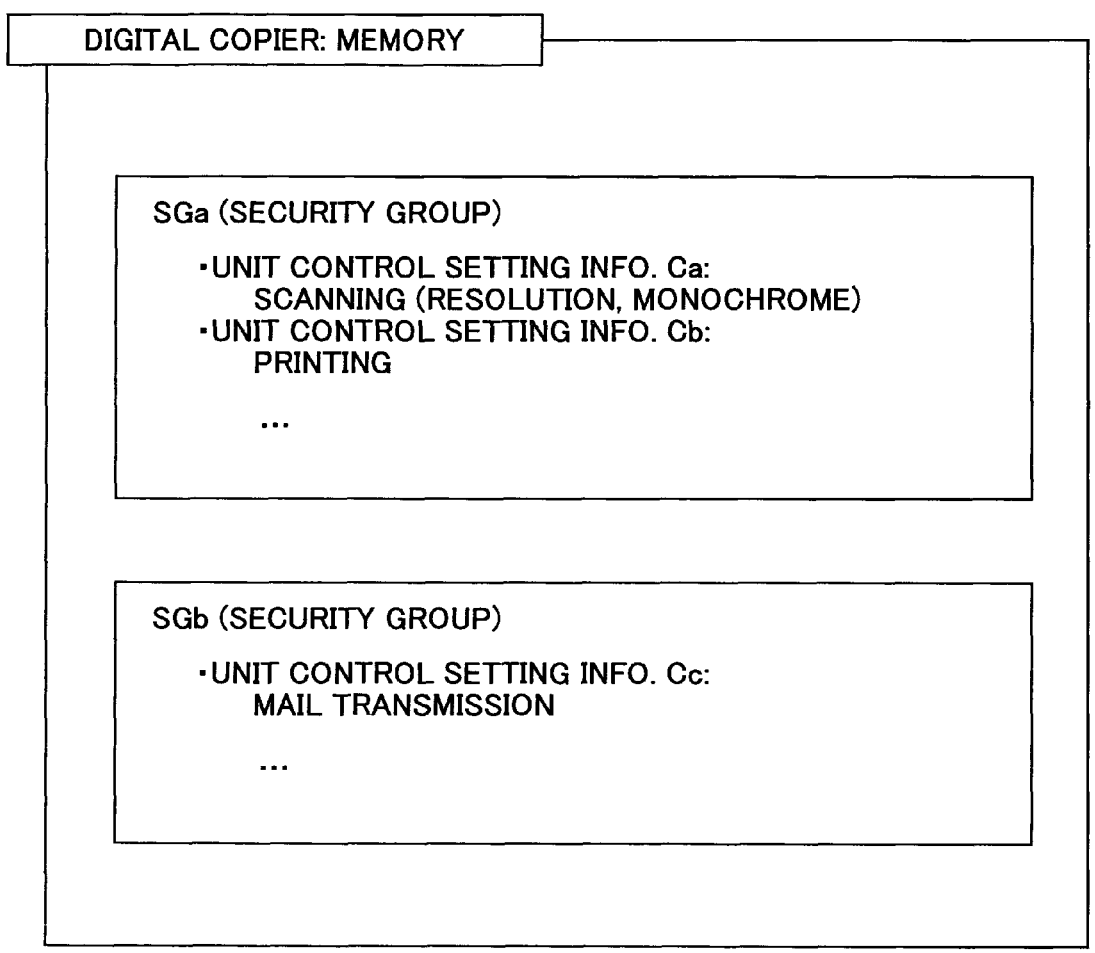

The management of security can be more easily performed by setting a security group as unit control setting information in advance. For examples it is possible to set up the unit control setting such that the unit control setting information Ca and Cb belongs to security group a (SGa), and the unit control setting information Cc belongs to security group b (SGb) as shown in FIG. 14A. The unit control setting information that the security group is set up is held in the memory 10 of the digital copier 1 shown in FIG. 1 (refer to FIG. 14B).

In order to set up that user authentication code a belongs to SGa and user authentication code b belongs to SGb, it is secured the area for security groups in a use authentication information area, and stores the security group who belongs to this area.

Figure 12:
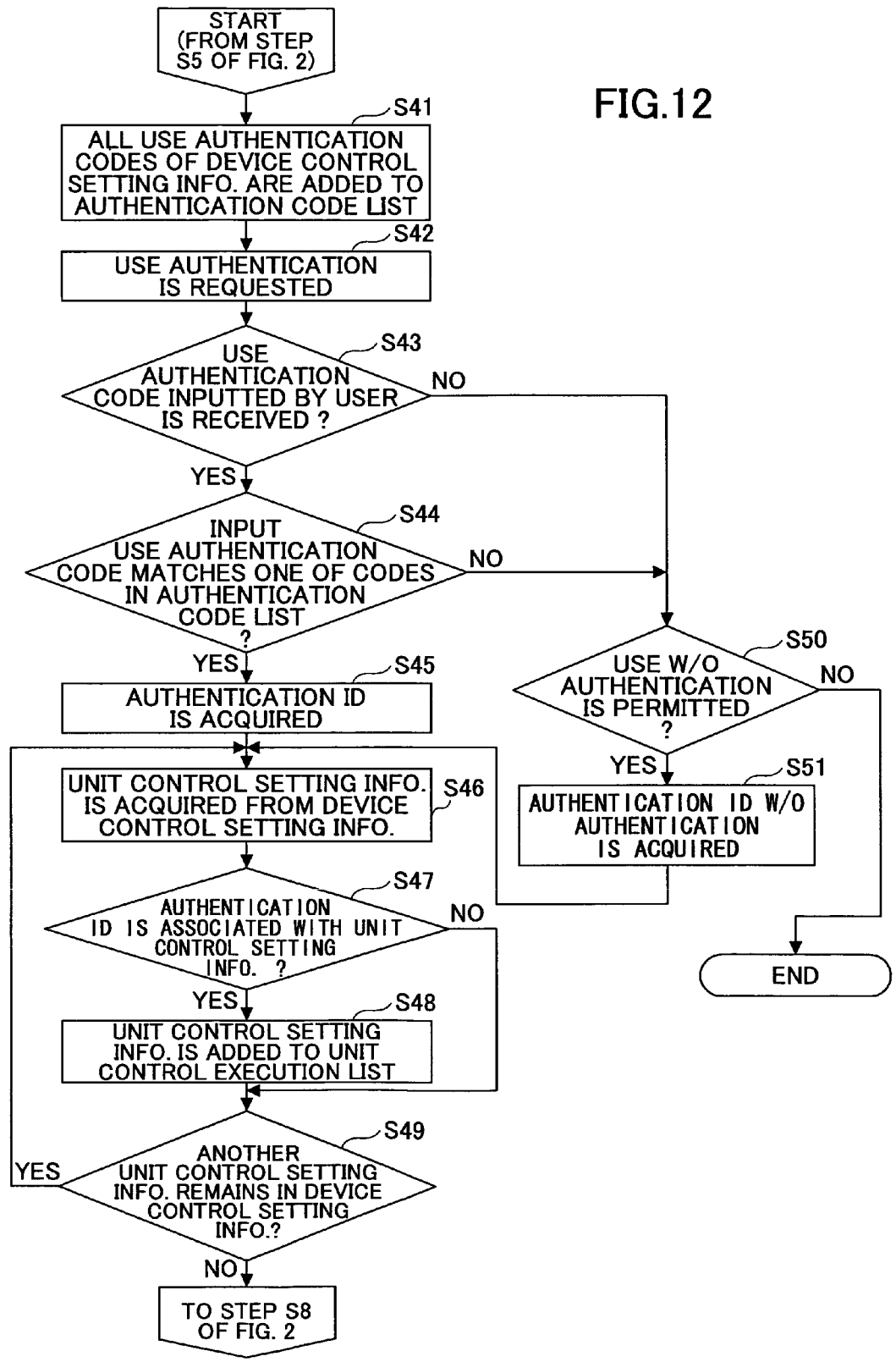
FIG. 12 is a flowchart for explaining operation in the embodiment 6 the invention.

The security group who belongs in the steps S45 and S51 of the flowchart shown in FIG. 12 is stored, the security group information on unit control setting information is acquired from the memory 10 of the digital copier 1 in the step S47, and the comparison with the present affiliation security group is performed.

While the same effect as the above-mentioned is acquired, security can be set up only by setting up the security group of use authentication code a and use authentication code b at the time of device control setting medium creation.

When the digital copier mentioned above is what has a use authentication function, operation of the user can also be simplified more by using this function.

By associating the security group with the use authentication code of the digital copier, when using the device by carrying out use authentication of this, it will be in the state where the user's security group can be specified.

When the device control setting medium which holds a setup of a security group in this state is used, by the security group who related with the use authentication code, the user can use a device control setting medium from the associated use authentication code by acquiring the user's security group from a digital copier automatically, without performing use authentication again.

In addition, a device control setting medium can be used from the security group who related even when this user's use authentication code is not contained in the device control setting medium. When it is thought from a viewpoint of security that use of this security group automatic acquisition function is not appropriate, it is also possible to control use of this function.

It is possible to change the unit control setting information in a device control setting medium which can be used with the use authentication method for authenticating the user. Since the direction of the use authentication method using the IC card which embedded the authenticator the use authentication using living body information, including fingerprint authentication, and replication are generally more difficult than the use authentication by the input of a password is hard to be used for others, the reliability of authentication becomes high.

Therefore, when use authentication with a password is performed, it is made to make only the unit control with required low authority perform, and in the use authentication using living body information, when raising security, it is valid enabling it to also perform high unit control of required authority.

In the example of FIG. 13, the use authentication code according a use authentication code with a password to use authentication code a and fingerprint information is stored in use authentication code b. By having such composition, when use authentication with a password is performed, Ca and Cb are performed, and when use authentication by fingerprint information is performed, all the unit control of Ca, Cb, and Cc comes to be performed.

Thus, by changing the unit control performed by a use authentication method, the suitable security according to an authentication method can be set up.

Next, the embodiment 7 of the invention will be explained. When unit control is changed with a use authentication method like the above-mentioned embodiment 6, the contents of execution may be changed.

In a case as the device has a setup of functional authority, since the device control setting information registered into the device control setting medium may be unable to set it as the device, also in such a case, the contents of execution may be changed.

When the case in which the contents of execution may be changed is taken into consideration, the user wants to check the contents of execution in advance, but if the display indication is given such that some contents of the setting of the device control setting medium are readable as shown in the above embodiment 4, such contents of execution will be known by another person besides the user, and it is not desirable with respect to the security.

Then, in the embodiment 7, the processing which notifies the contents of execution of device control setting medium to the user after the use authentication is completed will be explained.

For example, suppose that a device control setting medium is set up with "resolution: 300 dpi" and "image type: full color". After the device control setting medium is read and use authentication is performed, a display indication of the setup is displayed on the display. The user can check the display indication "resolution: 300 dpi" and "image type: full color", etc. in advance, and can perform the device control setting.

Figure 15:
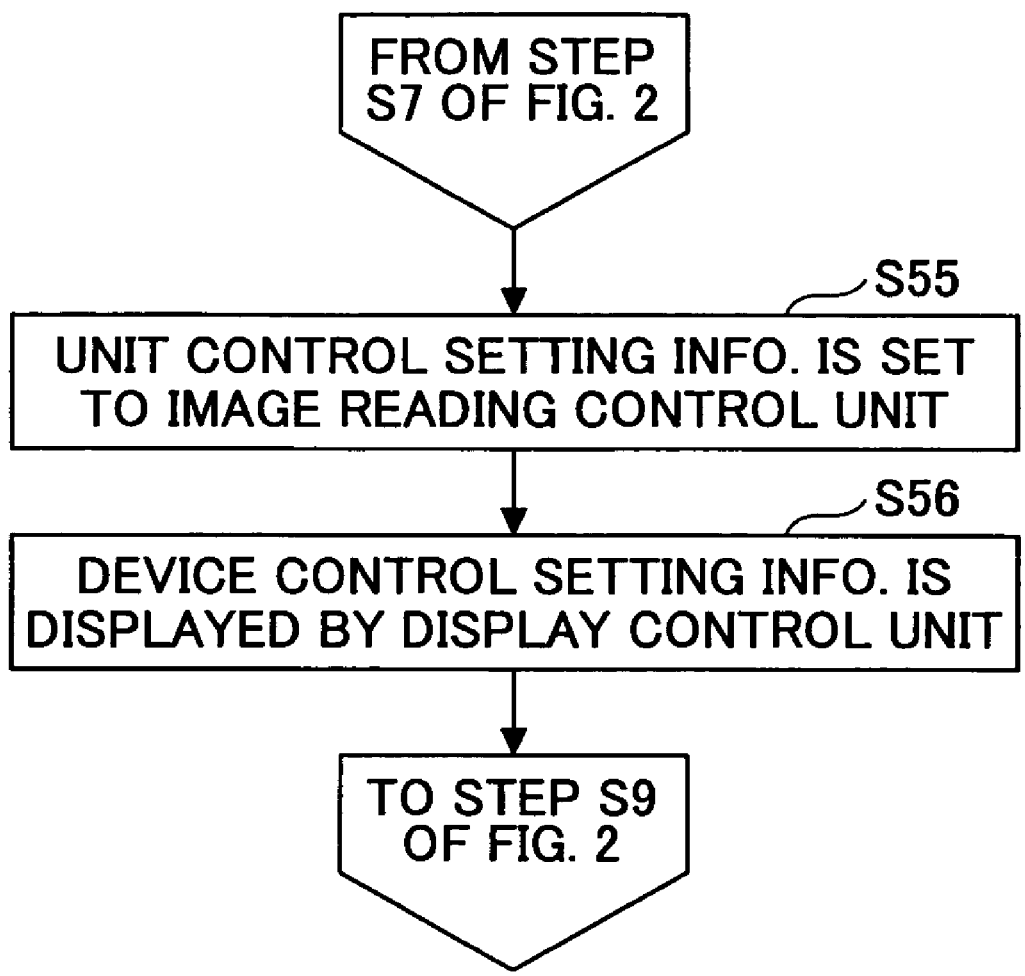
FIG. 15 is a flowchart for explaining operation in the embodiment 7 of the invention.

Next, the processing in the embodiment 7 will be explained using the flowchart shown in FIG. 15. The flowchart of FIG. 15 is provided to replace step S8 in the above-mentioned flowchart of FIG. 2.

After the setting is performed in step S55, the device control setting information set up in step S55 is displayed using the display control unit (S56).

In the embodiment 7, when the user already grasps the information set as the device control setting medium, the setup is displayed before execution each time, and that it must check can consider for the user the case of being troublesome.

Then, only when some functions are restricted and an executed result may differ from former, it is made to notify the user, in order to solve such trouble.

For example, suppose that in a device control setting medium, "resolution: 300 dpi" and "image type: full color" is set up. However, the data processing apparatus side an administrator "image type: full color" is inhibited, even if it performs, it becomes an error and cannot perform.

In such a case, the user can detect that it cannot perform before execution by displaying with displays, such as the display indication "image type: full color cannot be performed".

Figure 16:
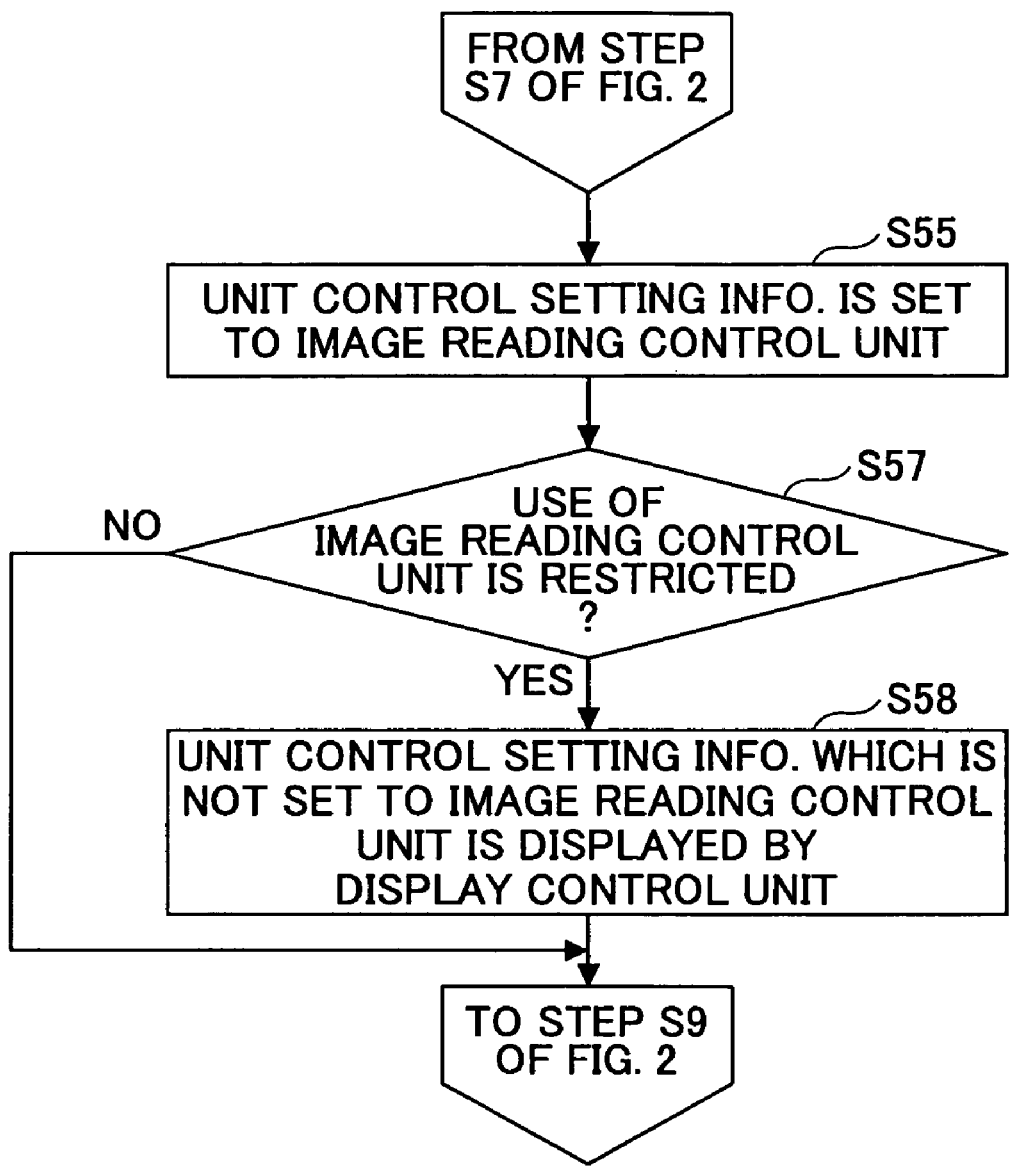
FIG. 16 is a flowchart for explaining operation 2 in the embodiment 7 of the invention.

The processing of the example mentioned above will be explained using the flowchart shown in FIG. 16. This flowchart is provided to replace step S8 in the above-mentioned flowchart of FIG. 2.

The information on whether any authority are carried out to the image reading control unit with which CPU is set up for CPU based on information after setting device control setting information as a image reading control unit (S55) is acquired (S57).

The CPU displays the device control setting information which is not able to be set as the image reading control unit with a display control unit, and notifies the user of it (S58).

Although the user can grasp the setup by notifying a setup of a device control setting medium in the above-mentioned embodiment in the embodiment 7, the user cannot change the setup. Then, it enables it to change the setup further after the contents identification of a setting by the above-mentioned notice.

For example, when "image type: full color" is set as inhibition of use, and cannot perform "image type: full color" is displayed by the above-mentioned embodiment, a "change button" is displayed simultaneously with it.

The device control setting information can be changed by pressing the "change" button, and it makes it possible to change and perform a setup to "image type: monochrome".

Figure 17:
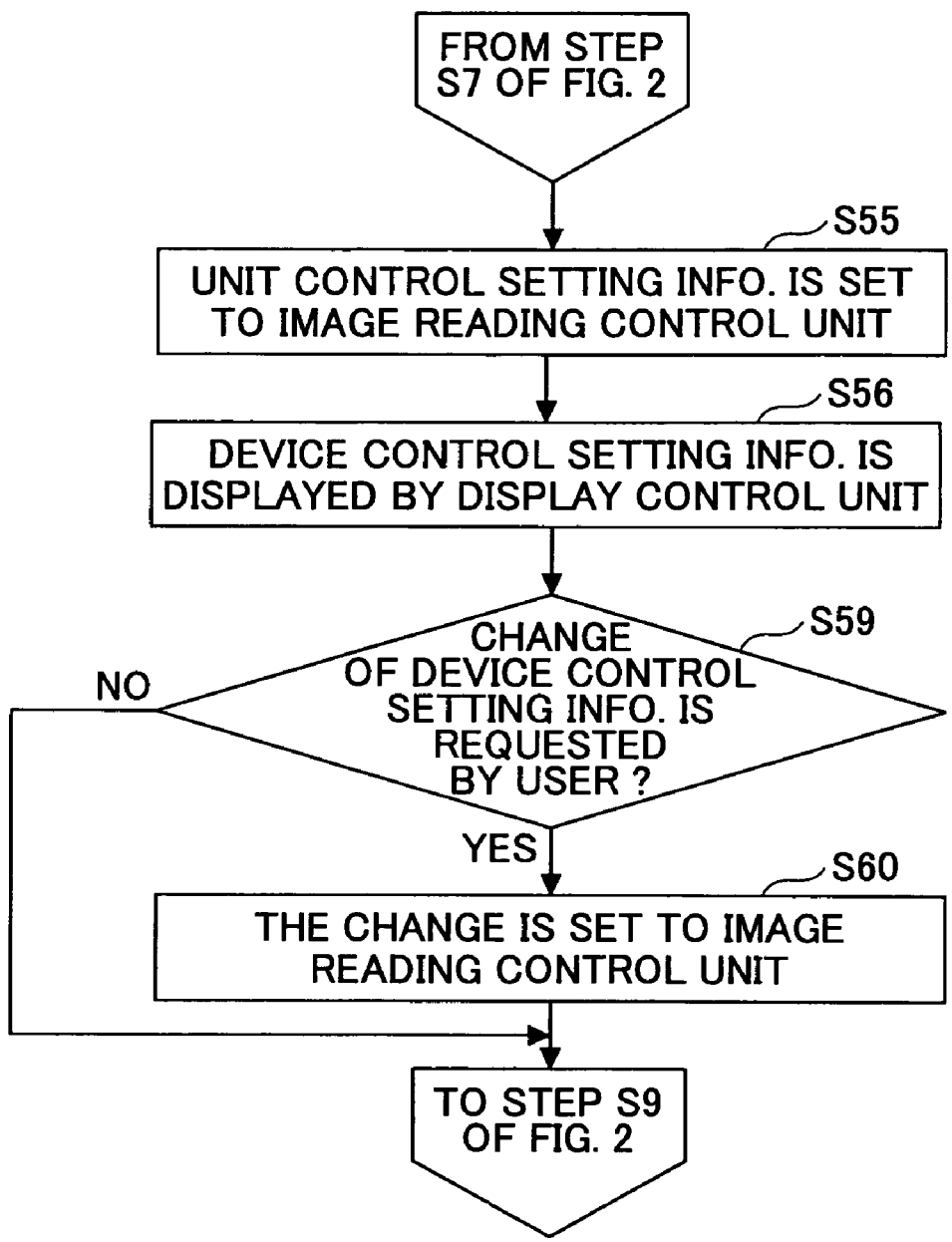
FIG. 17 is a flowchart for explaining operation 3 in the embodiment 7 of the invention.

The processing of the example mentioned above will be explained using the flowchart shown in FIG. 17.

This flowchart is provided to replace step S8 in the above-mentioned flowchart of FIG. 2.

The user can choose whether the display indication (S56) and its setup are changed for device control setting information with a display control unit in step S55 after setting up the device control setting information on processing 55 (S59). It changes and the contents of change are set as the image reading control unit to change (S60). Thereby, the setup can be changed after the contents identification of a setting.

It is assumed that the number of times of use authority of the device control setting medium is set as authentication of the security group as for whom authentication processing of a security group is made as in the embodiment 6 mentioned above.

When it is used exceeding the number of times of use authority of a device control setting medium, it may become impossible and for a device control setting medium to use it suddenly.

In order to solve the problem, a security group's information and the use history information on a device control setting medium are acquired from the device. It notifies, before performing the information, including what day there will be till change of a security group, the remaining number of times of use, and an expiration date in the back, restricted as compared with the information of a device control setting medium, the security group. The user becomes possible to grasp the situation according to the display indication.

Figure 18:
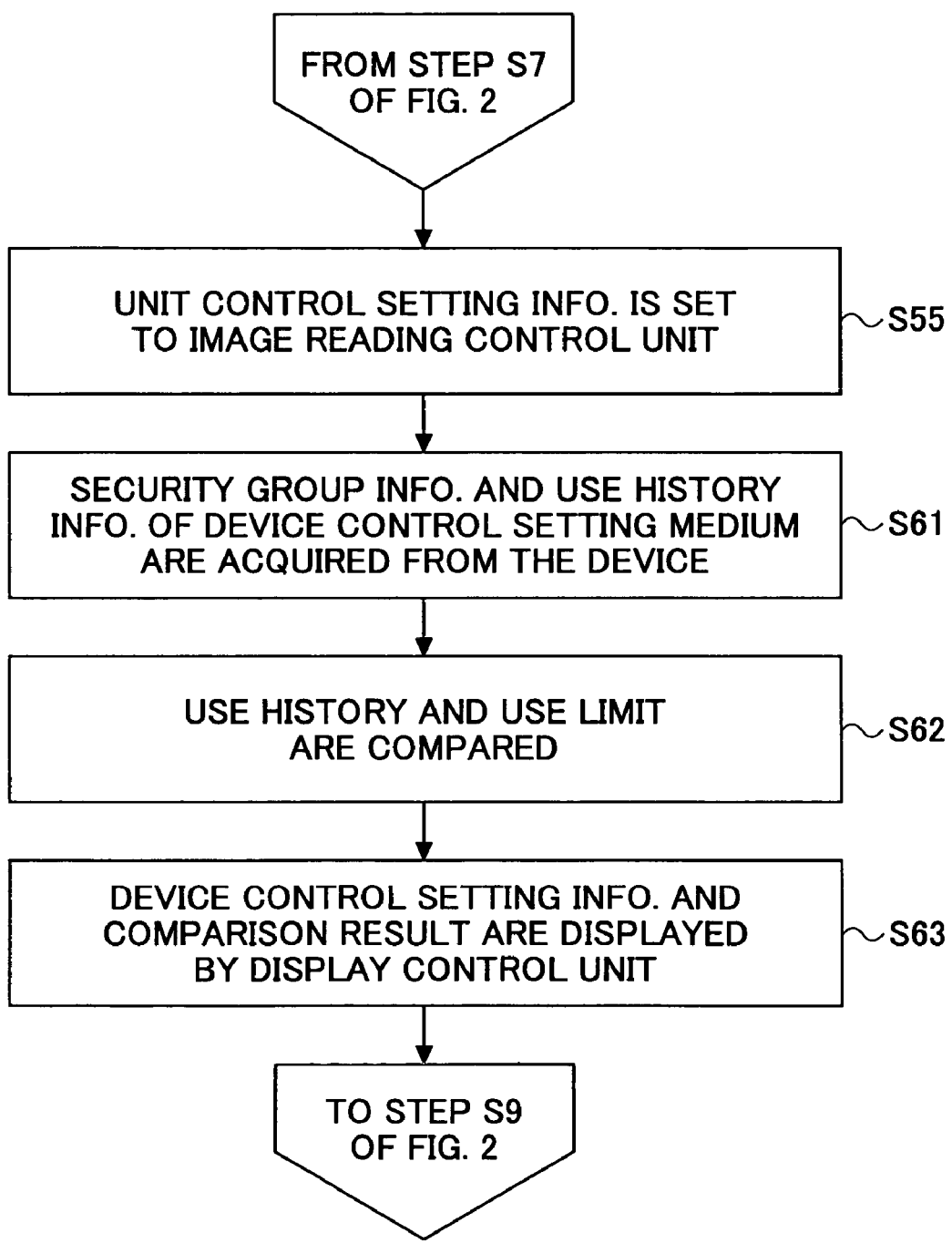
FIG. 18 is a flowchart for explaining operation 4 in the embodiment 7 of the invention.

The processing of the example mentioned above will be explained using the flowchart shown in FIG. 18.

This flowchart is provided to replace step S8 in the above-mentioned flowchart of FIG. 2. The security group's information and the use history information on a device control setting medium are acquired from the device after step S55 (S61).

The security group's information is compared with the use history information on a device control setting medium, for example, the remaining number of times of use and the days by an expiration date are calculated (S62). The result is set up and displayed on a display control unit (S63).

As mentioned above, the user is mainly notified of use history information using displays, such as a display, but it may be made to notify the server of the use history information in the embodiment 7.

When the device control setting medium has been lost, there is a danger of being unjustly used for the others. In such a case, it can be grasped whether it is the no used unjustly with which the device control setting medium is used or when it is used, and by seeing the record saved to the server, if information is transmitted to the server.

For example, information, including the date, the execution device, and the contents of execution, is generated after completion of processing execution using a device control setting medium. It is realizable by transmitting use history information automatically on the server 25 (or the PC 24) currently left and installed by the LAN course through LAN control unit 5 shown in FIG. 1. Managing the use situation of a device control setting medium in each device is also possible.

In the above-mentioned embodiment, the use history of the device control setting medium must be extracted from use history information to check the use history of a specific device control setting medium from use history information. All the executed results in which various pieces of use history information are stored in the device and are performed with the device are saved.

For this reason, it is difficult to see simply only the use history of a specific device control setting medium. Then, the use history of the device control setting medium is displayed for a device control setting medium at the time of use, and the user used to enable it to check the use history information simply.

For example, when displaying device control setting information, the "history" button is prepared together and it enables it to display and check the history for which the device control setting medium is used which presses the "history" button Next, the embodiment 8 of the invention will be explained. In the embodiment 8, validity or invalidity of device control setting information media is automatically set up for the digital copier. For example, when it becomes impossible to take the synchronization with the server which has managed use history information, use of a device control setting medium is repealed automatically.

Figure 19:
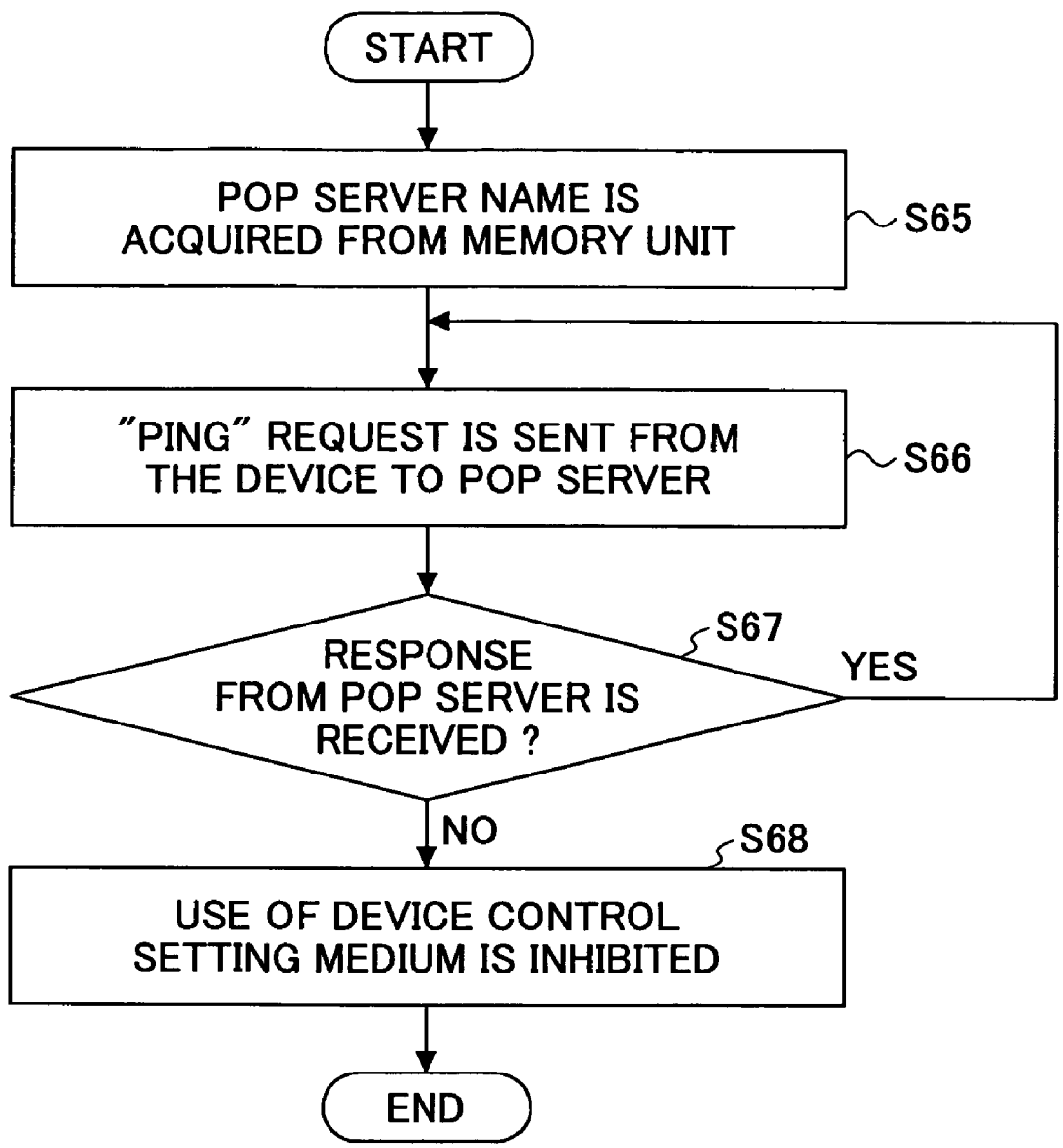
FIG. 19 is a flowchart for explaining operation in the embodiment 8 of the invention.

The processing of the example which repeals valid and the media usage mentioned above will be explained using the flowchart shown in FIG. 19.

The CPU 2 of the digital copier 1 shown in FIG. 1 takes out a server name (for example, POP server name) from memory unit 3 (S65), for example, by a "ping POP3 server name", is a certain interval and connects it to an POP server (S66).

The administrator sets up an interval on the initialization screen of display 18 of digital copier 1, and it is stored in memory unit 3. When the response from an POP server is checked (S67) and a certain definite-period-of-time response cannot be found (No of step S67), the CPU 2 turns ON the bit for inhibition of use of device control setting medium" in an initialization list of the memory unit 3 (S68).

The administrator can set up the inhibition of use of device control setting medium" in this initialization list.

And if image reading control unit 12 controls image reader 17 and a device control setting medium is read, the CPU 2 acquires an initialization list from the memory unit 3.

When the CPU 2 checks the inhibition of use of device control setting medium from the initialization list, the CPU 2 controls the display control unit 13 to display on the display 18 a warning screen indicating "use of this function is inhibited by the administrator, and you are requested to consult the administrator".

In order to prevent the illegal use of a device control setting medium, the digital copier of the embodiment 8 is adapted for inhibiting the use for every device control setting medium, by adding a serial number or the like to every device control setting medium.

The processing of this embodiment in which a serial number is added to every device control setting medium will be explained using the flowchart shown in FIG. 20.

Figure 20:
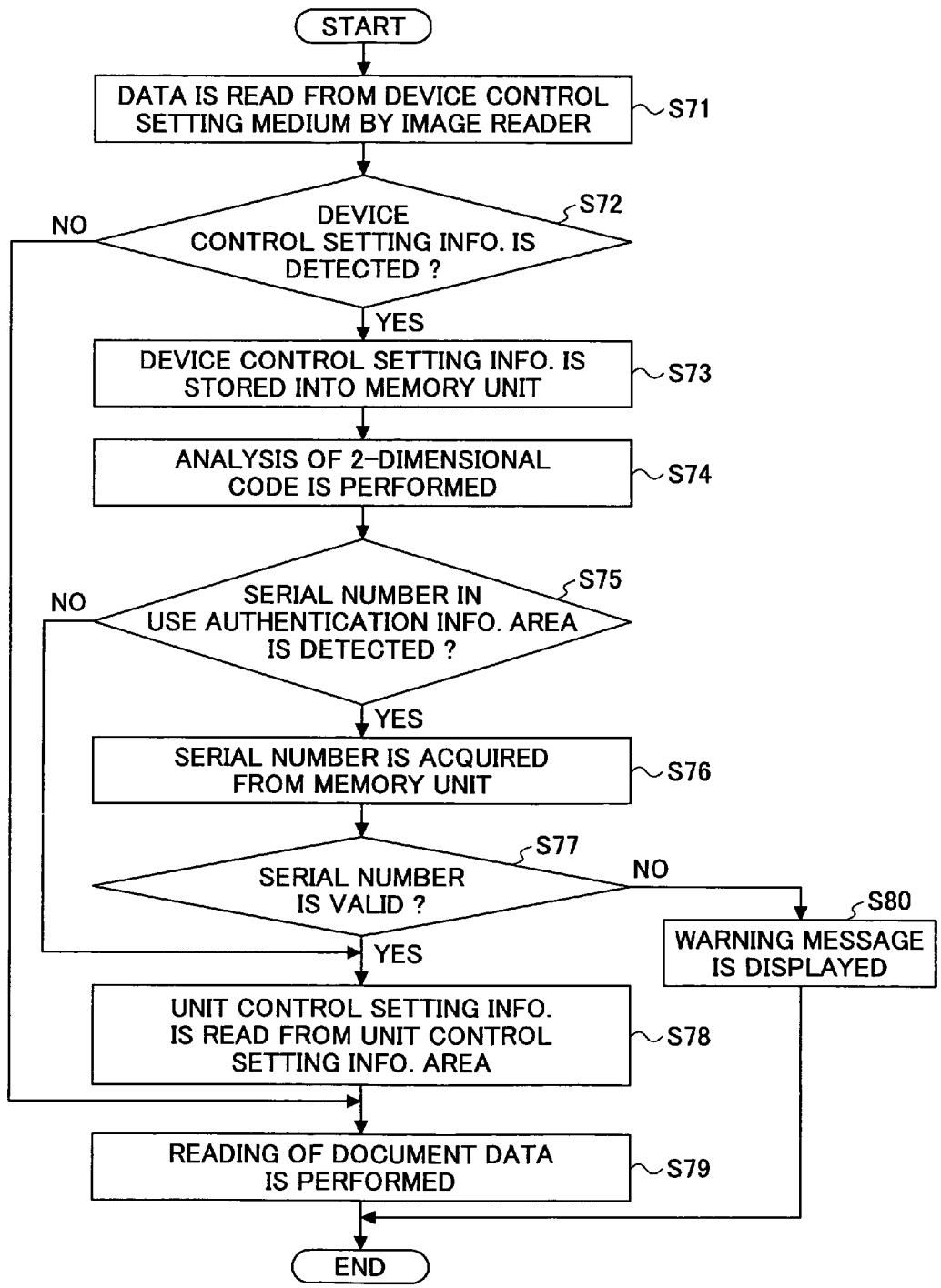
FIG. 20 is a flowchart for explaining operation 2 in the embodiment 8 of the invention.

Upon start of the processing of FIG. 20, the image reading control unit 12 shown in FIG. 1 controls the image reader 17 to read the device control setting information (S71).

When existence of device control setting information can be detected (S72) and it is not able to be detected in the document data which image reader 17 read (No of step S72), it is determined that this document data is a normal document, and the normal document reading processing is performed (S79).

When the two-dimensional code of device control setting information is detected in the predetermined position in document data (Yes of step S72), this device control setting information is read, it stores in memory unit 3, and it is notified to the CPU 2 that the device control setting medium may be used in a document (S73). If this notice is received, the CPU 2 will analyze the two-dimensional code information stored in memory unit 3 (S74).

Figure 21:
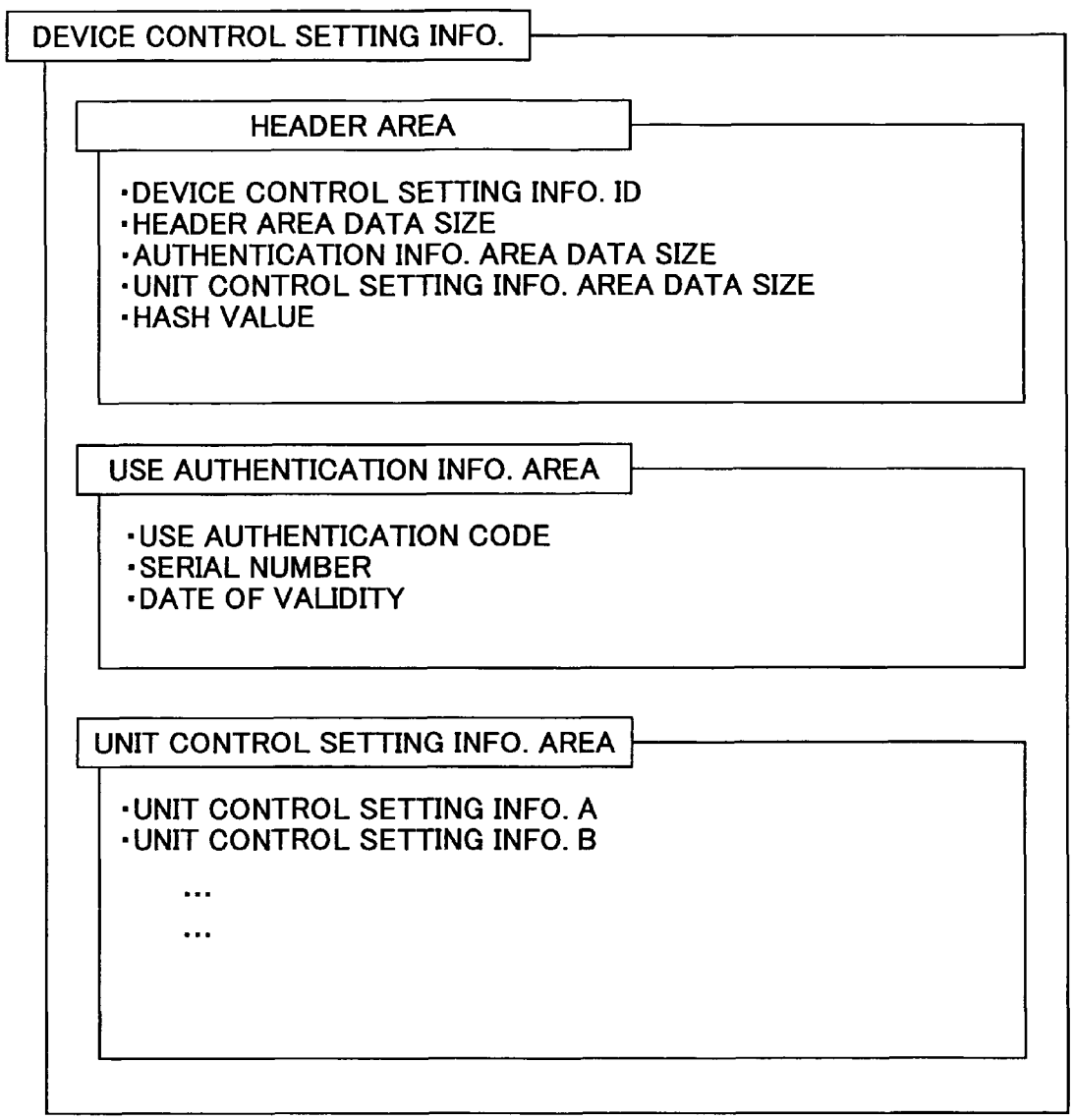
FIG. 21 is a diagram showing the composition of a device control setting information in the embodiment 8 of the invention.

As shown in FIG. 21, the device control setting information is constituted by a device control setting information header area, a use authentication information area, and a unit control setting information area.

If the two-dimensional code information is judged to be device control setting information in the analysis of the device control setting information header area, the use authentication information will be checked as authority of device control (S75).

The use authentication information area is used for the use which checks whether the user has the execution authority of this device control setup. The CPU 2 will acquire the obtained serial number from memory unit 3, if a serial number is taken out from the use authentication information area (Yes of step S75) (S76).

The serial number stored in memory unit 3 is restricted by the administrator using the bit value of an or available or (bit: 0) impossible (bit: 1). It checks whether the serial number is available (S77), and when available (Yes of step S77), a unit control setting information area is read (S78).

Moreover, when it cannot be used (No of step S77), the CPU 2 controls the display control unit 13 to display on the display 18 a warning message "since use restriction is set up by the administrator, this document cannot be used and you are requested to consult the administrator" (S80).

Thus, by attaching a serial number for every device control setting medium, it can prevent carrying out the illegal use of the device control setting medium, and the security of each user who is using this medium can be raised. This serial number is printed on the device control setting medium when the device control setting medium is created.

A management table is prepared for the server which can register it in the memory 10 of the digital copier 1, and the device control setting medium is managed by acquiring or referring for the list of serial numbers from the table.

Another example which prevents the illegal use of a device control setting medium in the digital copier of the embodiment 8 will be explained using the flowchart shown in FIG. 22.

Figure 22:
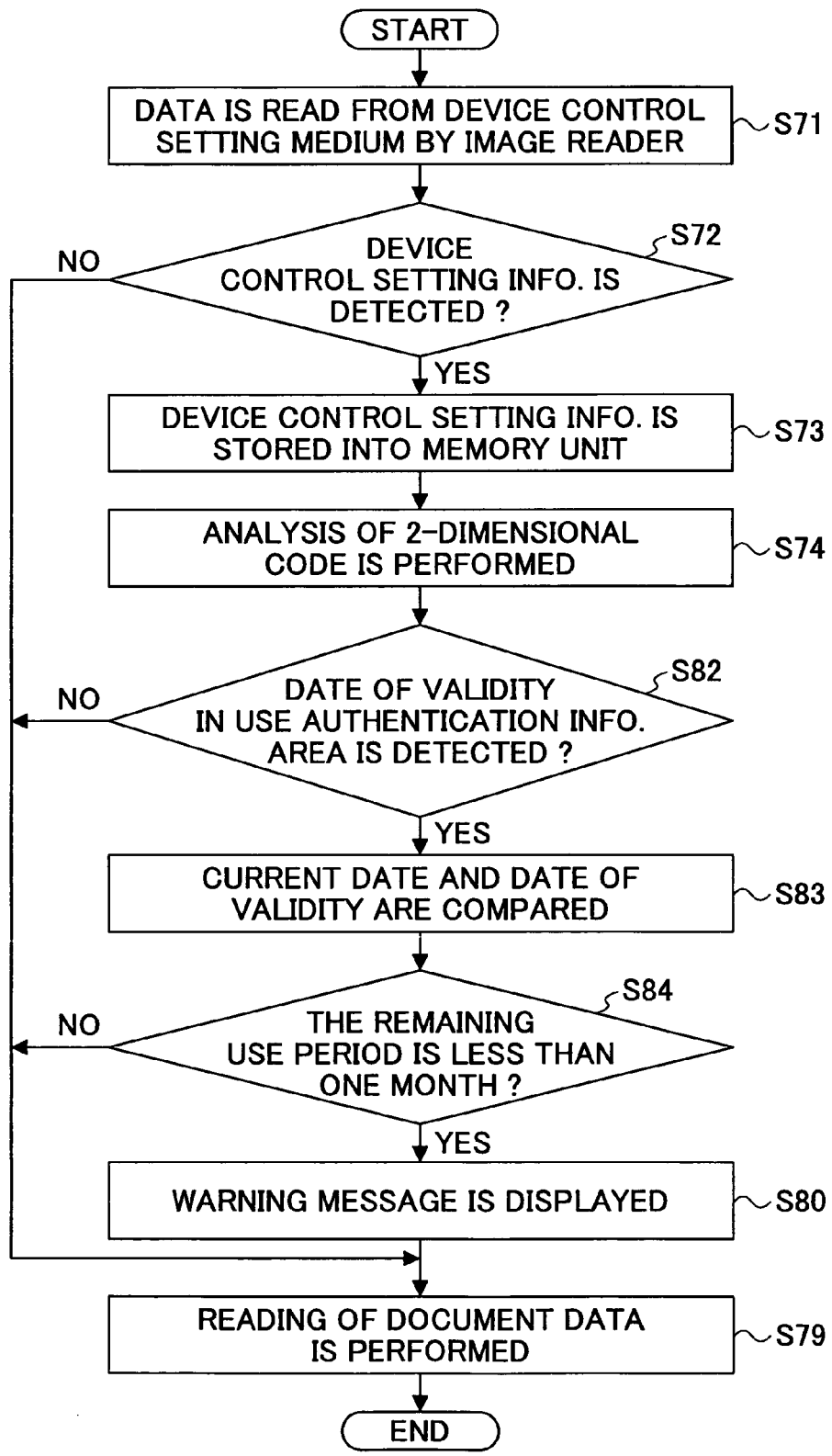
FIG. 22 is a flowchart for explaining operation 3 in the embodiment 8 of the invention.

As shown in FIG. 22, the image reading control unit 12 shown in FIG. 1 controls the image reader 17 to read device control setting information (S71).

When are able to check existence of device control setting information (S72) and it is not able to be detected in the read document data (No of step S72), it is determined that this document data is a normal document, and the normal document reading processing is performed (S79).

When the two-dimensional code of device control setting information is detected in the predetermined position in document data (Yes of step S72), this device control setting information is read, it stores in memory unit 3, and it is notified to the CPU 2 that the device control setting medium may be used in a document (S73). If this notice is received, the CPU 2 will analyze the two-dimensional code information stored in memory unit 3 (S74).

As shown in FIG. 21, the device control setting information is constituted by the device control setting information header area, the use authentication information area, and the unit control setting information area.

If two-dimensional code information is judged to be device control setting information in the analysis of the device control setting information header area, the use authentication information will be checked as authority of device control (S74).

The use authentication information area is used for the use which checks whether the user has the execution authority of this device control setup.

When the existence of a use term which restricts use from the use authentication information area is checked (S82) and there is a use term (Yes of S82), the CPU 2 compares with the present time, if a use term is taken out (S83).

When the time of the use term remains and it is below one month, judging from this comparison result (S84) (Yes of step S84), a warning message "use term remains on display 18 using display control unit 13, and the CPU 2 is below one month, and you are requested to change the password" (S80).

Thus, by attaching a use term for every device control setting medium, it can prevent carrying out the illegal use of the device control setting medium, and the security of each user who is using the device control setting medium can be raised.

Next, the embodiment 9 of the invention will be explained. As the above-mentioned embodiment 1 explained, use authentication is carried out at the time of use of a device control setting medium, the user is restricted, and security is raised.

Figure 23:
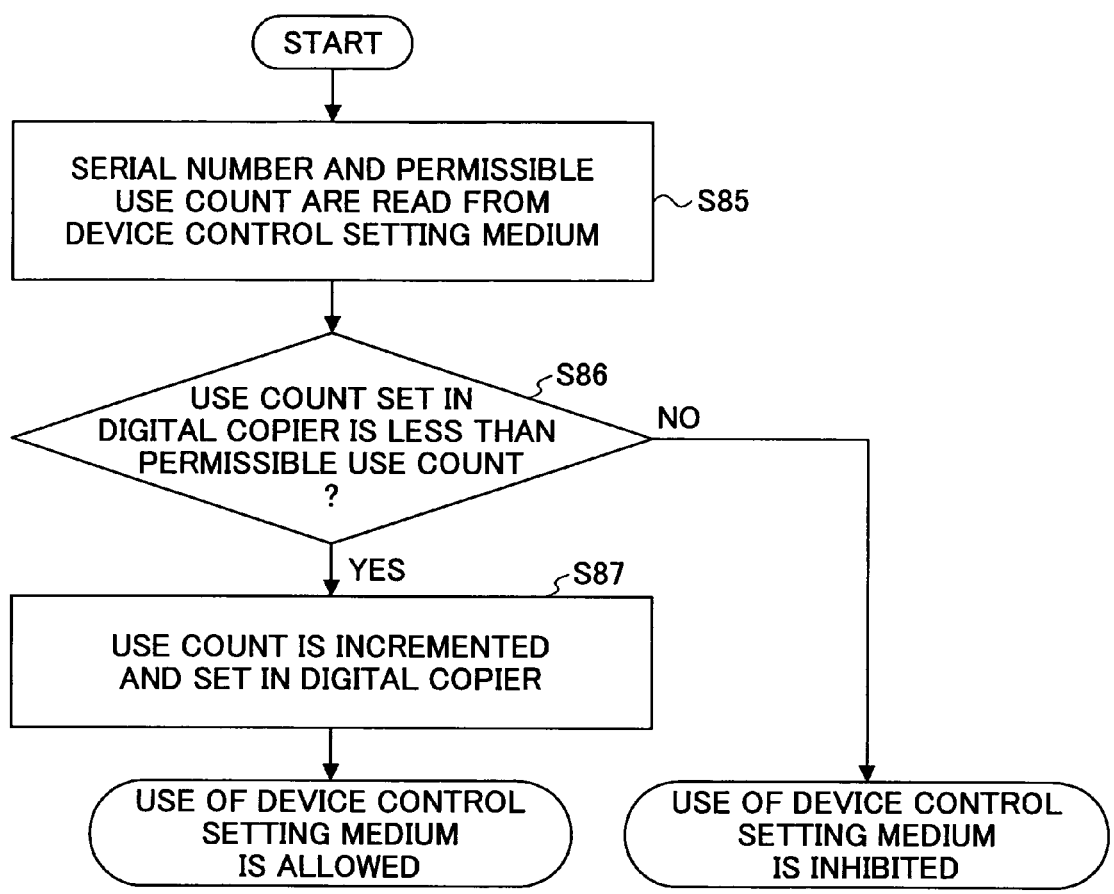
FIG. 23 is a flowchart for explaining operation in the embodiment 9 the invention.

When the number of times of restriction is set as a device control setting medium and conditions are not fulfilled by the embodiment 9, use of the device control setting medium is inhibited, and it explains, referring to the flowchart shown in FIG. 23 about the example which raises security further.

First, the serial number within device control setting information and the number of times of available are read from a device control setting medium (S85).

The serial number and the number of times of available are intercalated in the use authentication information area, as shown in FIG. 21 at the time of device control setting medium creation.

Next, use is inhibited when it is outside the permitted number of times of use as compared with the number of times of use of the device control setting medium currently recorded on the digital copier (S86) (No of step S86).

The number of times of use makes memory 10 shown in FIG. 1 correspond with a serial number, and is stored. When it is in the permitted number of times of use (Yes of step S86), the number of times of use currently recorded on the digital input/output device is carried out +1 (S87), and use of the device control setting medium is permitted.

Although the permitted number of times of use is explained in the above example, the model of digital copier which carries out use permission, use permission time, and a day of the week are feasible similarly.

The use by the user who has a high password of authority cannot be concerned with restriction time and date, but it can be used with combination with a password at any time is also possible.

The identification of use authority of device control setting medium in the embodiment 9 may be carried out at the time of step S71 which could carry out after step S74 of the flowchart shown in FIG. 20 in the above-mentioned embodiment 8, and FIG. 22, or read the device control setting medium.

Next, the embodiment 10 of the invention will be explained. In the invention, the device control setting medium which controls multi-function input/output devices, such as a digital copier, using the medium in which optical reading is possible is created.

However, the media (mainly paper) in which optical reading is possible deteriorate according to a soil or a secular change, and there is a possibility that it may become impossible to read the contents indicated there.

When nothing copes with it, the information currently recorded on the medium by deterioration will be lost and the time and effort of creating a device control setting medium again will occur.

And when the contents of processing are not indicated in visible on the device control setting medium, it is difficult to create the device control setting medium which performs the same processing.

For this reason, when the device control setting medium deteriorates, the convenience to the user can be improved by recognizing the deterioration and performing the same processing to create new device control setting medium automatically.

The above-mentioned function can be attained by recording the device control setting information using a code having a resistance to read errors. For example, the currently used QR Code is a two-dimensional code having a data error correcting function according to the Reed-Solomon method.

In the following, a method of automatic re-output (re-creation) of a device control setting medium when the QR Code is used for recording the device control setting information will be explained.

As mentioned above, the QR Code is a two-dimensional code in which data is encoded by using the Reed-Solomon method, and the resistance to read errors is increased for data correction taken against the deterioration of spot, stain, breakage, etc. of the code (data area) to be read.

A Reed-Solomon code (code created by the Reed-Solomon method) is a code having a high correction capability to burst errors. It is rare for the contents to suffer a loss discretely by media, such as paper, and since the deficit of the contents occurs continuously in many cases, in QR Code, the code is used as an error correcting code.

In the case of error correcting, since acquisition of an error rate is also possible, deterioration of a device control setting medium is detected from the error rate of device control setting information using this feature, and a re-output is performed.

Next, the processing in the embodiment 10 in FIG. 24 will be explained using the flowchart shown in FIG. 25.

In order to perform the embodiment 10 in the form added to the flowchart shown in FIG. 2 of the embodiment 1 mentioned above, it explains referring to FIGS. 2, 24 and 25.

First, a document (device control setting medium) is read with image reader 17 of digital copier 1 shown in FIG. 1 (FIG. 2:S1). And it is judged whether device control setting information is in the document read in step S1 using the judgment algorithm of a device control setting medium (FIG. 2:S2).

When judged with it being a device control setting medium (FIG. 2: Yes of step S2), device control setting information is acquired by decoding QR Code of a device control setting medium (FIG. 24:S91).

Although the algorithm which decodes this QR Code comprises two or more steps internally and a detailed procedure is followed using the known technology, an error rate is detectable in the data error detection step in this algorithm to decode, and a data error correcting step, this is stored as a medium error rate.

Since the error correcting level is embedded by the specification of QR Code in this QR Code, the marginal error rate at which the QR Code can be corrected from this error correcting level is acquirable with specification. The marginal error rate is stored as a medium marginal correction error rate.

Figure 24:
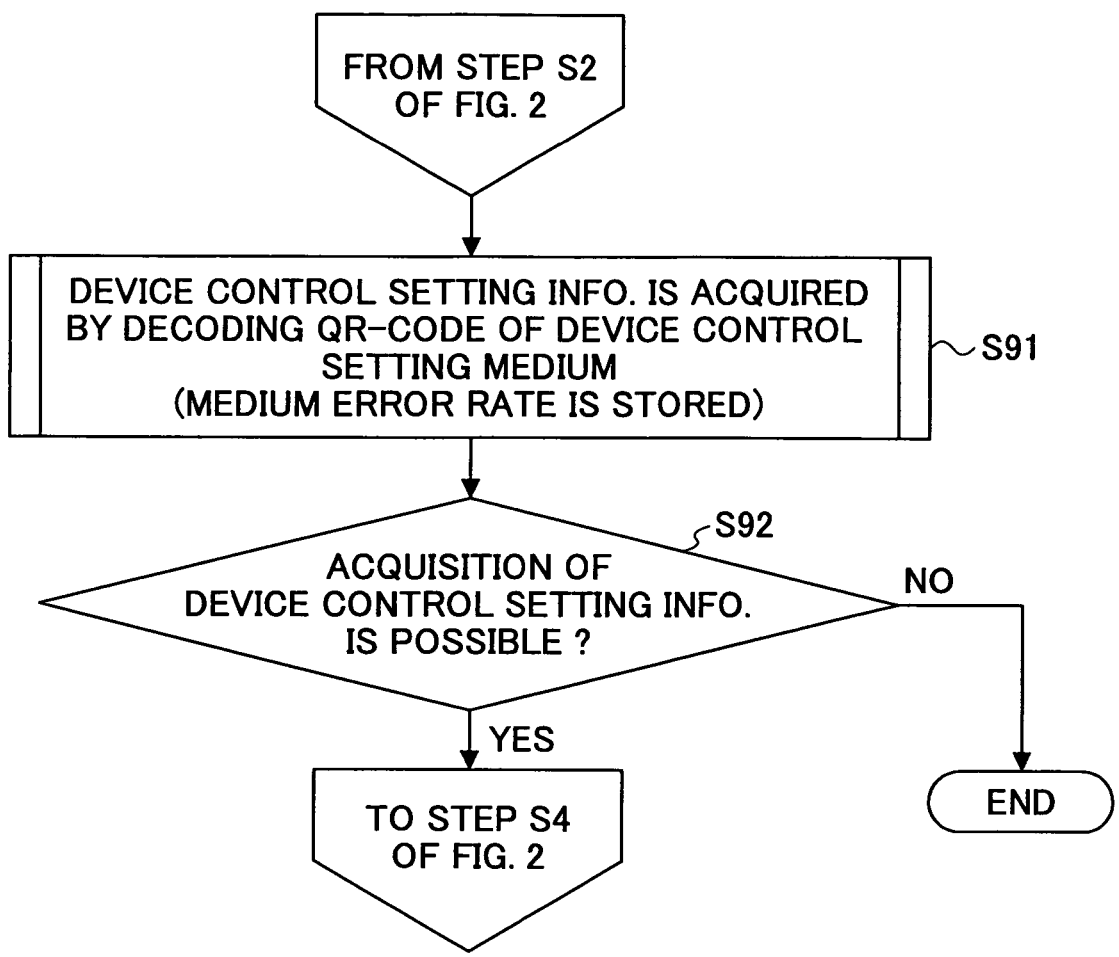
FIG. 24 is a flowchart for explaining operation in the embodiment 10 of the invention.

When deterioration of a device control setting medium is intense at the time of decoding in step S91, the propriety of acquisition of device control setting information is judged (FIG. 24:S92) and acquisition is not completed (FIG. 24: No of step S92), use of a device control setting medium is ended.

When acquisition of device control setting information is completed (Yes of FIG. 24:S92), digital copier 1 is controlled by this device control setting information (FIG. 2:S4-S9).

After the above-mentioned control is completed, deterioration of the device control setting medium is judged and it is judged whether the re-output of a device control setting medium is performed. A specific percentage of the correction capability that should be used can be detected by using the medium error rate and the medium marginal correction error rate which are stored in step S91. This correctable use rate (the specific percentage of the correction capability used) can be computed in accordance with the formula: the correctable use rate=(medium error rate)/(medium marginal correction error rate).

In order to show that it becomes impossible to correct the use rate when the correctable use rate is too large, the judgment of performing a re-output when the value (re-output threshold) with this correctable use rate is exceeded is performed.

The re-output threshold can be set up by recording it in the digital copier or recording it in the device control setting medium. The re-output threshold is acquired from the recorded data (FIG. 25:S93). And it is judged whether the re-output is to be performed (FIG. 25:S94). When the correctable use rate is less than the re-output threshold (FIG. 25: No of S94), the re-output of the device control setting medium is not performed, and the use of this medium is ended.

Figure 25:
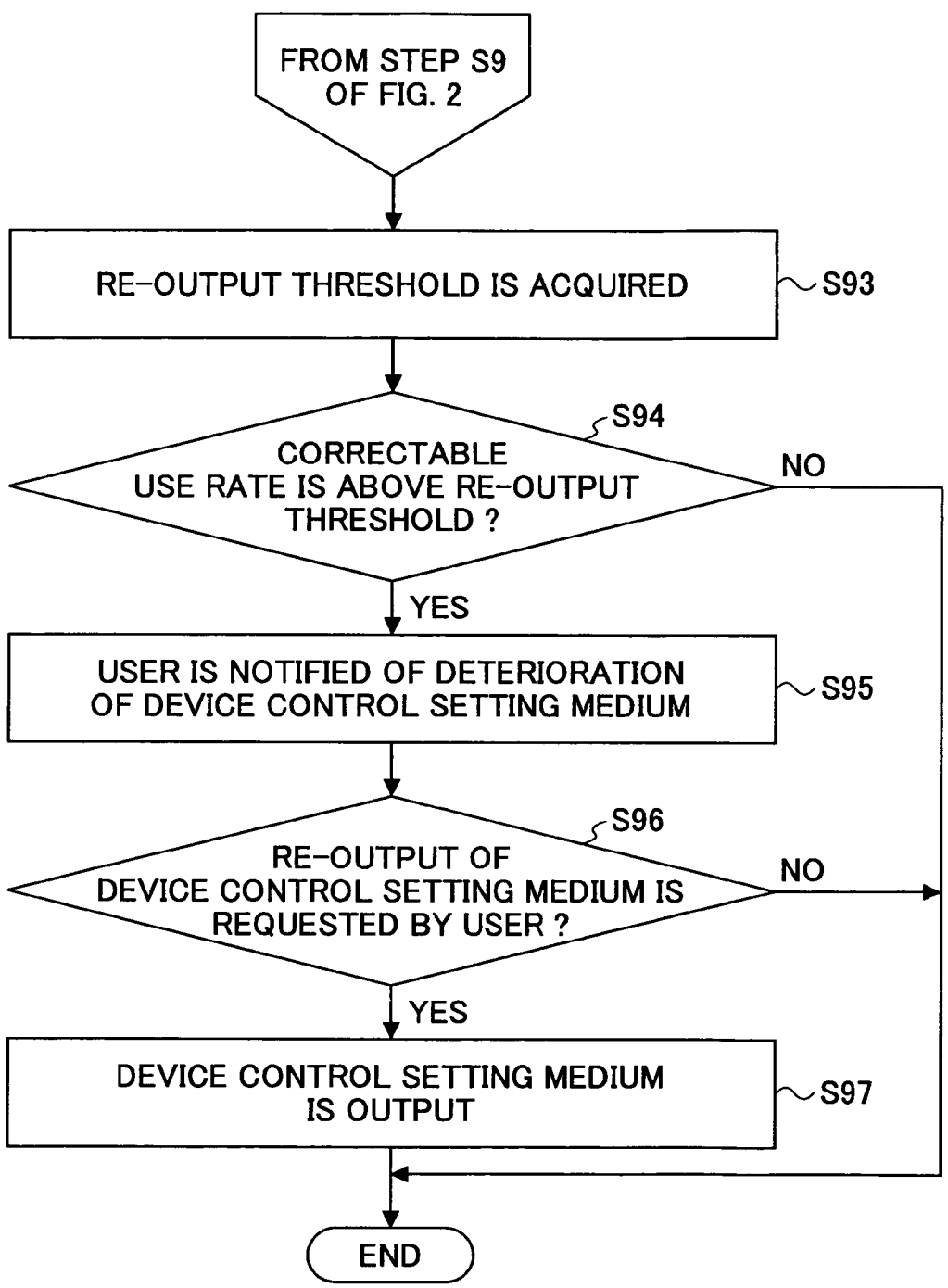
FIG. 25 is a flowchart for explaining operation in the embodiment 10 of the invention.

When the correctable use rate is above the re-output threshold (FIG. 25: Yes of step S94), a display indication indicating that the device control setting medium has deteriorated is displayed (FIG. 25:S95), and the user is requested to indicate whether re-output is performed (FIG. 25:S96).

When the user wishes to perform the re-output (FIG. 25: Yes of step S96), creation and output of a new device control setting medium is performed based on the device control setting information acquired in step S91 of FIG. 24, and the use of the device control setting medium is ended (FIG. 25:S97).

On the other hand, when the user does not wish to perform the re-output (FIG. 25: No of step S96), the use of the device control setting medium is ended.

The present invention is not limited to the above-described embodiments, and variations and modifications may be made without departing from the scope of the present invention.

Further, the present application is based on and claims the benefit of priority of Japanese patent application No. 2006-009631, filed on Jan. 18, 2006, and Japanese patent application No. 2006-153295, filed on Jun. 1, 2006, the entire contents of which are hereby incorporated by reference.

What is claimed is:

1. A multi-function input/output device comprising:
   a document input unit acquiring document data from a document;
   a document-input control setting unit controlling the document input unit according to unit-control-setting information of the document input unit;
   a document data processing unit processing the document data acquired by the document input unit;
   a document-data-processing control setting unit controlling the document data processing unit according to unit-control-setting information of the document data processing unit;
   a document data output unit outputting processed document data;
   a document-data-output control setting unit controlling the document data output unit according to unit-control-setting information of the document data output unit;
   an optical reading unit optically reading an optically readable code from a device control setting medium on which device control setting information, including use authentication information and at least one unit-control-setting information for the document input control setting unit, the document-data-processing control setting unit, and the document-data-output control setting unit, is recorded;
   a control setting information recognizing unit recognizing the device control setting information, including the use authentication information, from the optically readable code read by the optical reading unit;
   a user authentication unit authenticating a user by using a use authentication code of the use authentication information; and
   a setting processing unit setting at least one of the respective unit-control-setting information of the document input unit, the document data processing unit, and the document data output unit, based on a recognition result of the device control setting information and the use authentication information.

2. A multi-function input/output device according to claim 1, further comprising:
   a restriction unit inhibiting the setting processing unit from setting the at least one of the respective unit-control-setting information as being stored as the device control setting information; and
   a restriction-canceling unit canceling inhibition by the restriction unit based on an authentication result of the user authentication unit.

3. A multi-function input/output device according to claim 1, wherein the user authentication unit is configured so that, when an input use authentication code input from the user matches the use authentication code of the device control setting medium, the setting processing unit is allowed to set the at least one of the respective unit-control-setting information without performing the user authentication.

4. A multi-function input/output device according to claim 1, wherein the user authentication unit is configured so that, when the optical reading unit optically reads a plurality of device control setting mediums sequentially, the user authentication unit cancels execution of use authentication related to a currently read device control setting medium when a use authentication code stored in the currently read device control setting medium matches a use authentication code recorded in a previously read device control setting medium.

5. A multi-function input/output device according to claim 4, wherein the plurality of device control setting mediums each containing an optically readable code are provided with the document, and the optically readable code is read from one of the plurality of device control setting mediums by the optical reading unit when the document data is acquired from the document by the document input unit.

6. A multi-function input/output device according to claim 1, further comprising:
   a registration unit registering the device control setting information of the device control setting medium in a memory unit as registration control setting information; and
   a starting unit starts execution of processing based on the registration control setting information.

7. A multi-function input/output device according to claim 1, further comprising:
   a device control setting medium output unit outputting, to a device control setting medium, an optically readable code containing each unit control setting information of the document input control setting unit, the document-data-processing control setting unit, and the document data output control setting unit, which is recognizable by the control setting information recognizing unit; and
   an addition unit adding a use authentication code for authenticating the user to the device control setting information.

8. A multi-function input/output device according to claim 7, wherein a portion of the device control setting information is recorded on the device control setting medium in a readable manner.

9. A multi-function input/output device according to claim 7, further comprising a registration unit allowing the user to register registration control setting information into the device control setting information, the registration control setting information being set up in the multi-function input/output device, and execution of processing based on the registration control setting information is started by the user.

10. A multi-function input/output device according to claim 1, wherein a plurality of use authentication codes of the device control setting information which are associated with different security levels are stored, and the user authentication unit authenticates the user by using one of the plurality of use authentication codes corresponding to a security level of the user.

11. A multi-function input/output device according to claim 10, further comprising:
   an association unit associating the use authentication information with each of the at least one unit control setting information contained in the device control setting information; and
   a restriction unit restricting use of each unit control setting information according to the use authentication information associated with the unit control setting information.

12. A multi-function input/output device according to claim 10, wherein a security group is set for each of the at least one unit control setting information contained in the device control setting information, and use authentication is performed according to each security group.

13. A multi-function input/output device according to claim 12, wherein, after the use authentication is performed according to each security group, it is detected whether a currently set security group is changed from a previously set security group, and, when the currently set security group is changed, the change of the security group is notified to the user.

14. A multi-function input/output device according to claim 1, wherein a plurality of use authentication methods for authenticating the user of the device control setting information are stored, and the user authentication unit is configured to use a different security level of the use authentication for each of the plurality of use authentication methods.

15. A multi-function input/output device according to claim 1, further comprising:
- a notification unit notifying the user of the device control setting information after the device control setting information is read from the device control setting medium; and
- a judgment unit determining whether use of the device control setting information is restricted, based on the use authentication information of the device control setting information,
- wherein the notification unit is configured to notify the user of the device control setting information when the use of the device control setting information is restricted.

16. A multi-function input/output device according to claim 1, wherein the device control setting information is recorded with a code having a resistance to read errors, an error rate is acquired from the device control setting information of the device control setting medium, and it is determined whether a re-output of another device control setting medium is performed, based on a result of judgment of the acquired error rate.

17. A control method for a multi-function input/output device including a document input unit acquiring document data from a document, a document-input control setting unit controlling the document input unit according to unit-control-setting information of the document input unit, a document data processing unit processing the document data acquired by the document input unit, a document-data-processing control setting unit controlling the document data processing unit according to unit-control-setting information of the document data processing unit, a document data output unit outputting processed document data, a document-data-output control setting unit controlling the document data output unit according to unit-control-setting information of the document data output unit, the method comprising:
- optically reading an optically readable code from a device control setting medium on which device control setting information, including use authentication information and at least one unit-control-setting information for the document input control setting unit, the document-data-processing control setting unit, and the document-data-output control setting unit, is recorded;
- recognizing the device control setting information, including the use authentication information, from the optically read code;
- authenticating the user by using a use authentication code of the use authentication information; and
- setting at least one of the respective unit-control-setting information of the document input unit, the document data processing unit, and the document data output unit, based on a recognition result of the device control setting information and the use authentication information.

* * * * *